United States Patent
Kojo

(10) Patent No.: US 8,189,864 B2
(45) Date of Patent: May 29, 2012

(54) COMPOSITE IMAGE GENERATING APPARATUS, COMPOSITE IMAGE GENERATING METHOD, AND STORAGE MEDIUM

(75) Inventor: Takashi Kojo, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 944 days.

(21) Appl. No.: 12/200,254

(22) Filed: Aug. 28, 2008

(65) Prior Publication Data

US 2009/0060385 A1 Mar. 5, 2009

(30) Foreign Application Priority Data

Aug. 29, 2007 (JP) ................................. 2007-222595
Jul. 31, 2008 (JP) ................................. 2008-197627

(51) Int. Cl.
*G06K 9/00* (2006.01)
*G09G 5/00* (2006.01)
(52) U.S. Cl. ................. 382/103; 345/629; 345/632
(58) Field of Classification Search .............. 382/100, 382/103
See application file for complete search history.

(56) References Cited

U.S. PATENT DOCUMENTS

| | | | | |
|---|---|---|---|---|
| 5,566,251 A * | 10/1996 | Hanna et al. | ............... | 382/284 |
| 5,923,791 A * | 7/1999 | Hanna et al. | ............... | 382/295 |
| 5,995,668 A * | 11/1999 | Corset et al. | ............... | 382/233 |
| 6,714,660 B1 * | 3/2004 | Ohba | ............... | 382/103 |
| 6,972,734 B1 * | 12/2005 | Ohshima et al. | ............... | 345/8 |
| 7,031,495 B2 * | 4/2006 | Takahashi et al. | ............... | 382/100 |
| 7,200,247 B2 * | 4/2007 | Ohba | ............... | 382/103 |
| 7,620,206 B2 * | 11/2009 | Ohba | ............... | 382/103 |
| 7,787,028 B2 * | 8/2010 | Kojo | ............... | 348/239 |
| 2001/0013869 A1 * | 8/2001 | Nozawa | ............... | 345/473 |
| 2002/0075286 A1 * | 6/2002 | Yonezawa et al. | ............... | 345/679 |
| 2002/0122573 A1 * | 9/2002 | Eraslan | ............... | 382/118 |
| 2003/0063669 A1 * | 4/2003 | Lee et al. | ............... | 375/240.08 |
| 2005/0225566 A1 * | 10/2005 | Kojo | ............... | 345/629 |
| 2006/0050087 A1 * | 3/2006 | Tanimura et al. | ............... | 345/629 |
| 2007/0052856 A1 * | 3/2007 | Jung et al. | ............... | 348/565 |
| 2007/0115286 A1 * | 5/2007 | Kondo et al. | ............... | 345/426 |

FOREIGN PATENT DOCUMENTS

JP 09237355 A * 9/1997

(Continued)

OTHER PUBLICATIONS

Korean Office Action dated Feb. 11, 2010 and English translation thereof in counterpart Korean Application No. 10-2008-0084712.

(Continued)

*Primary Examiner* — Jason M Repko
*Assistant Examiner* — Gandhi Thirugnanam
(74) *Attorney, Agent, or Firm* — Holtz, Holtz, Goodman & Chick, PC

(57) ABSTRACT

A plurality of items of shot image data obtained by temporally continuous shooting are analyzed. Marking data indicating that replaced graphic data is to be combined is added to image data corresponding to an actor and the resulting data is displayed. When a preset gesture (motion) is detected, marking data indicating that replaced graphic data u is to be combined is added to image data corresponding to another actor and the resulting data is displayed. After shooting, the individual items of image data to which marking data have been added are replaced with respective replaced graphic data. Replaced graphic data are created as moving images which capture the motions of the actors.

16 Claims, 23 Drawing Sheets

FOREIGN PATENT DOCUMENTS

| | | | |
|---|---|---|---|
| JP | 09326040 A | * | 12/1997 |
| JP | 2000-353249 A | | 12/2000 |
| JP | 2002-077592 A | | 3/2002 |
| JP | 2002-157607 A | | 5/2002 |
| JP | 2002157607 A | * | 5/2002 |
| JP | 2003-346170 A | | 12/2003 |
| JP | 2003-348323 A | | 12/2003 |
| JP | 2005-135355 A | | 5/2005 |
| KR | 10-2005-0004885 A | | 1/2005 |
| WO | WO 99/60522 A1 | | 11/1999 |

OTHER PUBLICATIONS

Japanese Office Action dated Jul. 19, 2011 (and English translation thereof) in counterpart Japanese Application No. 2008-197627.

* cited by examiner

| | TARGET IMAGE DATA 24T | REPLACED GRAPHIC DATA (1) 24Gw | MARKING DATA (1) 24Mw | REPLACED GRAPHIC DATA (2) 24Gw' | MARKING DATA (2) 24Mw' | AUDIO DATA (1) 24Sw | AUDIO DATA (2) 24Sw' |
|---|---|---|---|---|---|---|---|
| 24a | P | 24Gw1 | 24Mw1 | 24Gw1' (24Sw1') | 24Mw1' | 24Sw1 | 24Sw1' |
| 24b | M | 24Gw2 | 24Mw2 | 24Gw2' (24Sw2') | 24Mw2' | 24Sw2 | 24Sw2' |

COMPOSITE IMAGE GENERATING APPARATUS, COMPOSITE IMAGE GENERATING METHOD, AND STORAGE MEDIUM

CROSS-REFERENCE TO RELATED APPLICATIONS

This application is based upon and claims the benefit of priority from prior Japanese Patent Applications No. 2007-222595, filed Aug. 29, 2007; and No. 2008-197627, filed Jul. 31, 2008, the entire contents of both of which are incorporated herein by reference.

BACKGROUND OF THE INVENTION

1. Field of the Invention

This invention relates to a composite image generating apparatus, a composite image generating method, and a storage medium which combine a shot image with another image.

2. Description of the Related Art

A conventional image output apparatus extracts a human figure from an image shot with a digital camera, determines the posture of the extracted human figure, and combines a character image with the human figure according to the determined posture, thereby displaying the resulting image.

BRIEF SUMMARY OF THE INVENTION

It is an object of the invention to provide a composite image generating apparatus, a composite image generating method, and a program product which determine the changing part from a plurality of items of image data and produce image data corresponding to the changing part.

The foregoing object is achieved by providing a composite image generating apparatus comprising: a first storage unit configured to store a motion to be combined and first composite image data in such a manner that the motion and the first composite image data correspond to each other; an input unit configured to input a plurality of items of image data; a first determining unit configured to determine whether or not the movement of a part changing over a plurality of items of image data input by the input unit is almost the same as the motion stored in the first storage unit; and a first composite unit configured to read the first composite image data stored in the first storage unit so as to correspond to the motion and combine the first composite data with the image data having the changing part, if the first determining unit determines that the movement is almost the same as the motion.

The foregoing object is further achieved by providing a composite image generating method comprising: an input step of inputting a plurality of items of image data; a determination step of determining whether or not the movement of a part changing over a plurality of items of image data input in the input step is almost the same as a motion set so as to correspond to composite image data; and a composite step of, if it is determined in the determination step that the movement is almost the same as the motion, combining the composite image data set so as to correspond to the motion with image data having the changing part.

The foregoing object is further achieved by providing A computer readable medium for storing a program product for use with image generating apparatus including an image input unit, the program product comprising:

first computer readable program means for inputting a plurality of items of image data by the image input unit, second computer readable program means for determining whether or not the movement of a part changing over a plurality of items of image data input by the first computer readable program means is almost the same as a motion set so as to correspond to composite image data, and third computer readable program means for, if the second computer readable program means determines that the movement is almost the same as the motion, combining the composite image data set so as to correspond to the motion with the image data having the changing part.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
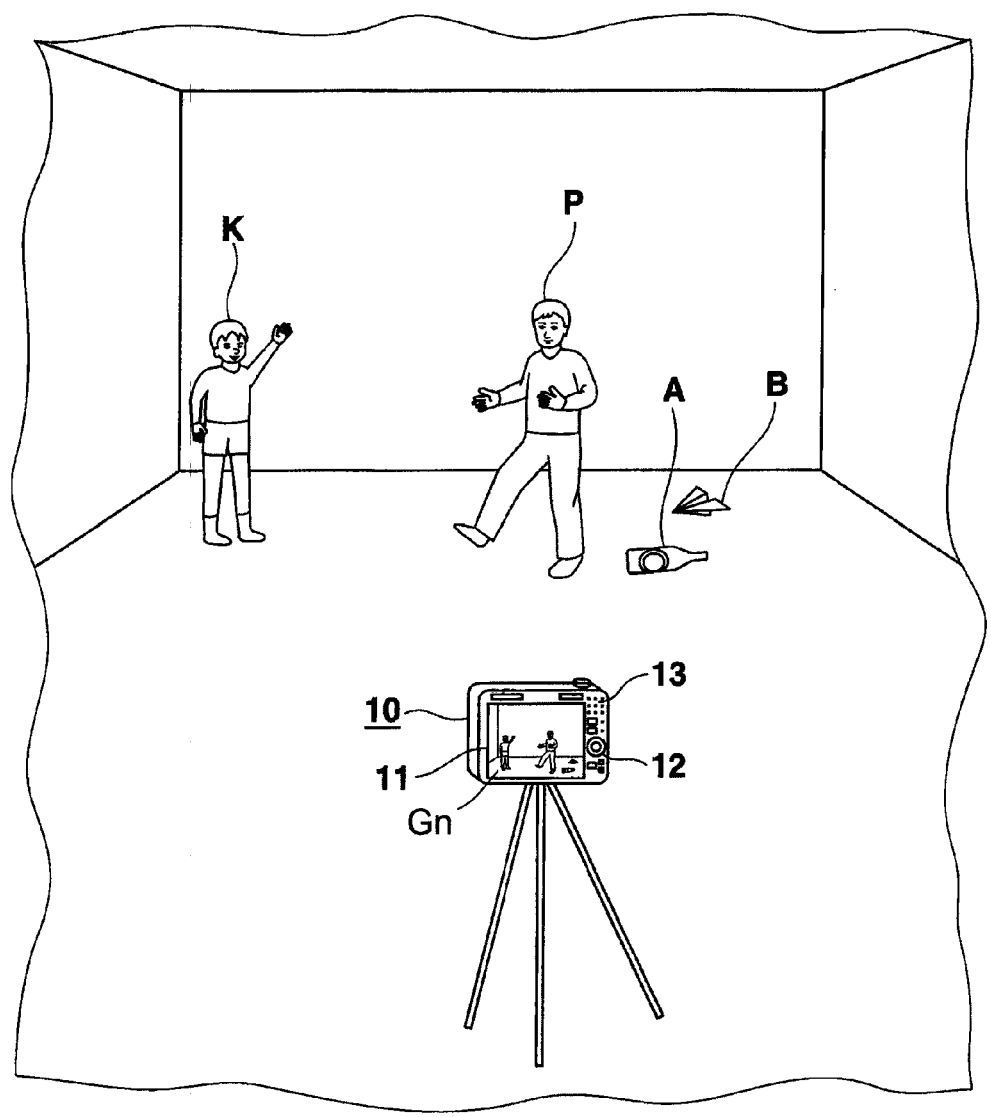
FIG. 1 shows a state where a moving image is shot in a first embodiment of the invention.
Figure 2A:
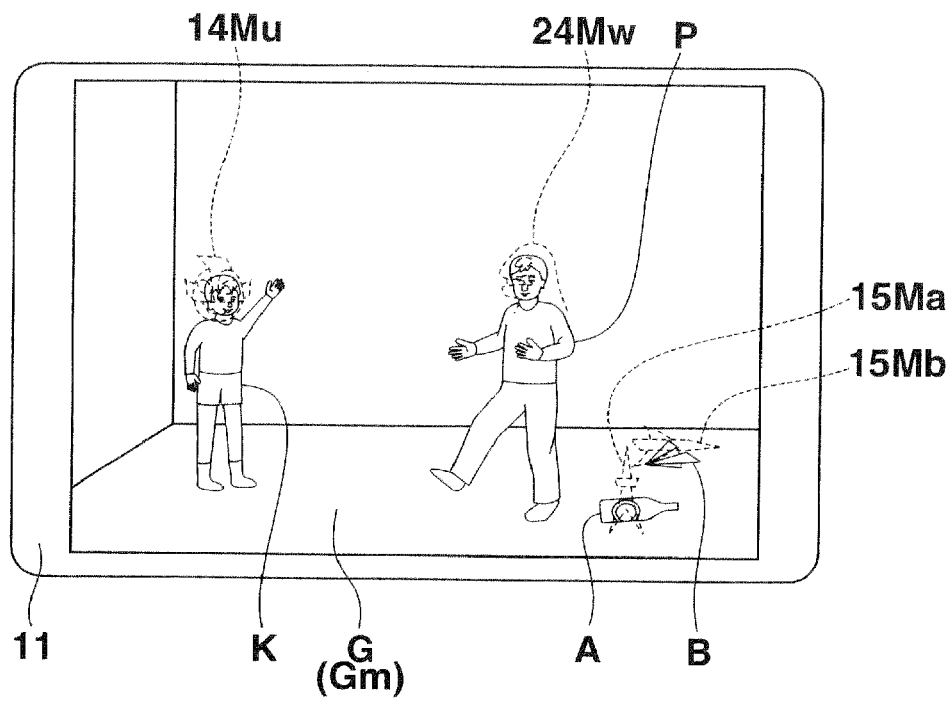
FIG. 2A shows a state where an image is displayed on a display unit 11.
Figure 2B:
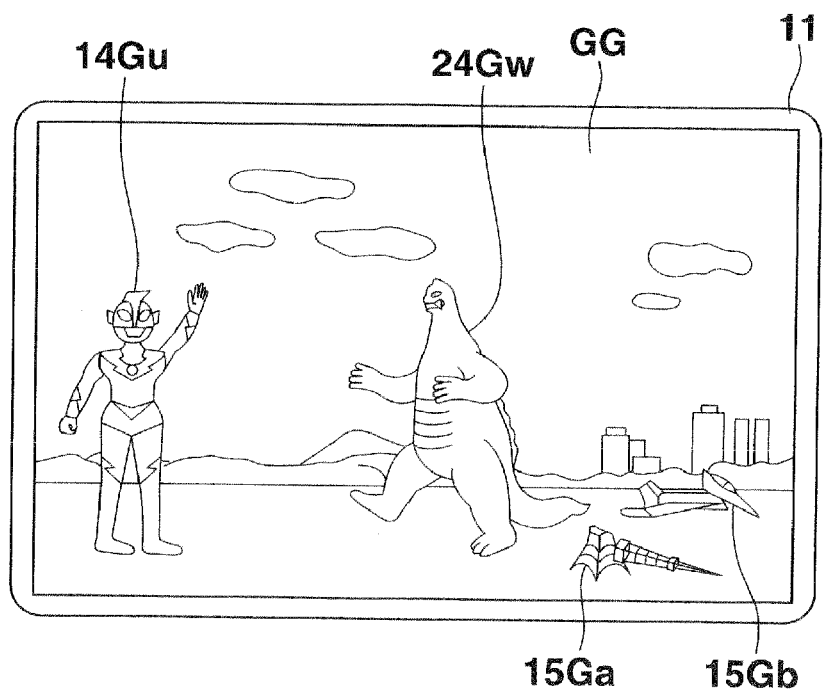
FIG. 2B shows a composite image displayed on the display unit 11 after shooting.

FIG. 1 shows a state where shooting is performed with a digital camera 10 according to an embodiment of the invention. FIG. 2A shows a state where an image is displayed on a display unit 11. FIG. 2B shows a composite image displayed on the display unit 11 after shooting.

The digital camera 10 has a display unit 11, an input unit 12, and an audio output unit (a speaker) 13 on the back of the digital camera 10. Shot image data Gn obtained by operating the input unit 12 is displayed in real time on the display unit 11, as shown in FIG. 1.

A scene where actor P knocks down object A and knocks off incoming object B and actor K makes a previously registered gesture is shot in the form of a video and recorded.

A plurality of items of shot image data Gn obtained by temporally continuous shooting are displayed on the display unit 11 in real time. At the same time, a plurality of items of shot image data are analyzed. Marking data 24Mw indicating that replaced graphic data 24Gw is to be combined is added to the image data corresponding to actor P and the resulting data is displayed. When a preset gesture is detected, marking data 14Mu indicating that replaced graphic data 14Gu is to be combined is added to the image data corresponding to actor K and the resulting data is displayed.

In addition, marking data (before contact) 15Ma indicating that replaced graphic data (before contact) 15Ga is to be combined is added to the image data corresponding to object A, and the resulting data is displayed. Marking data (before contact) 15Mb indicating that replaced graphic data (before contact) 15Gb is to be combined is added to object image data B and the resulting data is displayed.

Furthermore, when shooting is performed, the items of audio data previously stored so as to correspond to the individual items of marking data are read and output from the audio output unit 13.

In the explanation below, marked shot images Gm refers to what is obtained by adding marking data 24Mw, marking data 14Mu, marking data 15Ma, and marking data 15Mb to shot moving images.

After shooting, the individual items of image data (target image data) to which marking data 24Mw, 14Mu, 15Ma, and 15Mb have been added in the shot image data (added marking data) Gm are replaced with replaced graphic data 24Gw, replaced graphic data 14Gu, replaced graphic data 15Ga, and replaced graphic data 15Gb, respectively, as shown in FIG. 2B. Replaced graphic data 24Gw and replaced graphic data 14Gu are created as moving images which capture the motions of actors K and P. These are combined with background image data BG, thereby creating composite moving image data GG.

When detecting by image analysis that the target image data corresponding to object A and the target image data corresponding to object B come into contact with the target image data corresponding to actor P and actor K, the digital camera 10 replaces not only marking data (before contact) 15Ma and marking data (before contact) 15Mb with marking data (after contact) 15Ma' and marking data (after contact) 15Mb', respectively, but also replaced graphic data (before contact) 15Ga and replaced graphic data (before contact) 15Gb with replaced graphic data (after contact) 15Ga' and replaced graphic data (after contact) 15Gb', respectively, thereby producing composite data. The details will be described later.

Figure 3:
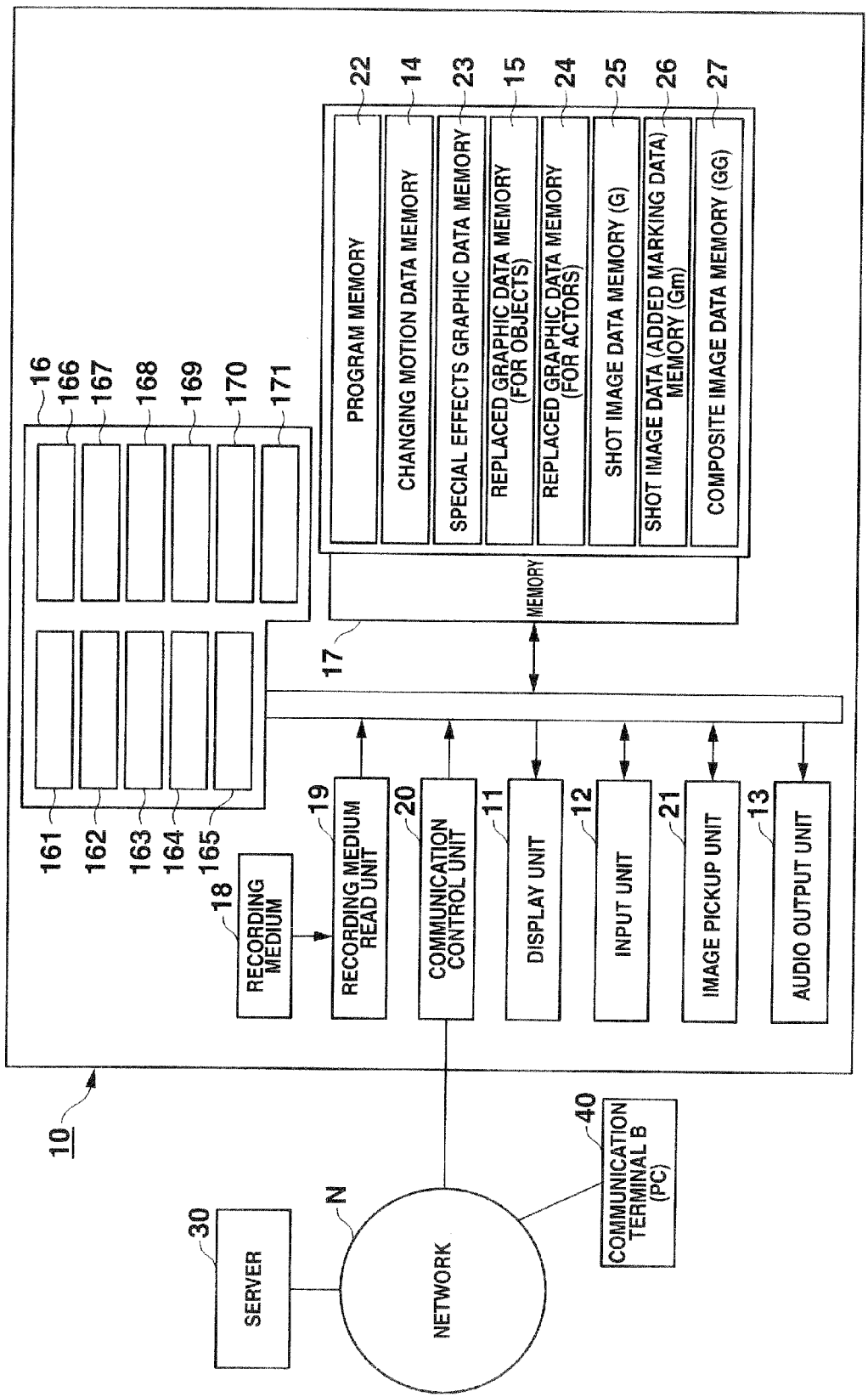
FIG. 3 is a block diagram showing a circuit configuration of a digital camera 10 of the embodiment.

FIG. 3 is a block diagram showing a configuration of the electronic circuit of the digital camera 10.

The digital camera 10 includes a CPU 16, and a computer.

The CPU 16 controls the operation of each section of the circuit according to a system program previously stored in a memory 17, a camera control program read from an external recording medium 18, such as a memory card, into the memory 17 via a recording medium read unit 19, such as a card slot, or a camera control program read from a server 30 on a network (N) into the memory 17 via a communication control unit 20.

The CPU 16 includes a processing unit which mainly performs the following functions:

An extracting unit 161 which recognizes actor K making a specific motion over a plurality of items of shot image data Gn continuous in time as a moving object and which further recognizes object A, object B, and actor P by image analysis and continuously extracts data as target image data.

A first determining unit 162 which recognizes the characterizing portion and shape of the image data and determines whether the target image data has been registered.

A first marking unit 163 which, if it is determined that the target image data has been registered, adds marking data to the target image data in a plurality of items of shot image data in such a manner that the marking data corresponds to the target image data and displays the resulting data.

A second marking unit 164 which, if it is determined that the target image data has been registered, determines whether the target image has been shot at the best angle and, on the basis of the result of the determination, adds other marking data to the target image data and displays the resulting data.

A second determining unit 165 which determines the positional relationship between the extracted target image data and other extracted target image data (more specifically, whether the extracted target image data makes contact with or overlaps with other extracted target image data) in a plurality of items of shot image data.

A third marking unit 166 which, if it is determined that the extracted target image data makes contact with or overlaps with the other extracted target image data, replaces the marking data with the other marking data, adds the marking data, and displays the resulting data.

A third determining unit 167 which determines whether the movement (motion) in a plurality of items of shot image data Gn in the extracted or marked target image data are almost the same as the previously registered ones.

A fourth marking unit 168 which, if it is determined that the motion is the previously registered one, adds marking data and displays the resulting data.

A replacing unit 169 which replaces the target image data with the replaced graphic data corresponding to the marking data for a plurality of items of shot image data to which marking data has been added.

A moving image generating unit 170 which captures the motion of target image data and creates moving image data obtained by moving the target image data three-dimensionally.

A composite moving image generating unit 171 which creates composite moving image data including created moving image data.

The processing programs in the processing units 161 to 171 have been stored in a program memory 22 and are loaded into the CPU 16 as needed. An image data monitoring process, an image recognition process, a capture process, and a three-dimensional imaging process have been stored in the image processing program and are loaded as needed.

The program memory 22 has stored a system program which supervises the entire operation of the digital camera 10, a camera control program which supervises the photographing operation, a communication control program which supervises the operation of communicating with the server 30 on the network N and an external PC (personal computer) as a communication terminal 40, and an audio output program. These programs are loaded according to a key input signal from the input unit 12, a shot input signal from an image pickup unit 21, or an input signal from an external unit (the server 30, the communication terminal 40) via the communication control unit 20.

Connected to the CPU 16 are not only the display unit 11, input unit 12, audio output unit 13, memory 17, recording medium read unit 19, and communication control unit 20 but also the image pickup unit 21 which includes a solid-state image sensing device (CCD), an imaging optical system, a distance sensor, and an illuminance sensor.

The memory 17 includes a changing motion data memory 14, a special effects graphic data memory 23, a replaced graphic data memory (for objects) 15, a replaced graphic data memory (for actors) 24, a shot image data memory 25, a shot image data memory (added marking data) 26, a composite image data memory 27, and a working data memory.

In the digital camera 10, a face part 24T of the target image data corresponding to actor P is stored beforehand into the replaced graphic data memory (for actors) 24 in such a manner that the face part corresponds to the replaced graphic data 24Gw.

In addition, target image data 15T is stored beforehand into the replaced graphic data memory (for objects) 15 in such a manner that the target image data corresponds to the replaced graphic data 15Ga.

Figure 4:
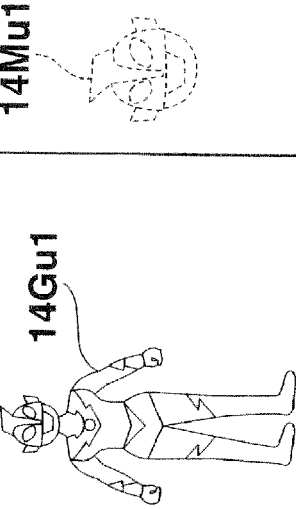
FIG. 4 shows contents previously stored in a changing motion data memory 14 of the embodiment.

FIG. 4 shows the contents of data previously stored in the changing motion data memory 14.

In the changing motion data memory 14, each of a storage area 14a and a storage area 14b stores motion data 14P, replaced graphic data 14Gu, marking data 14Mu, and audio data 14Su in such a manner that the motion data 14P, the replaced graphic data 14Gu, the marking data 14Mu, and the audio data 14Su correspond to one another.

In the storage area of the marking data 14Mu, marking data 14Mu1, 14Mu2 simply representing a plurality of types of replaced graphic data 14Gu1, 14Gu2 are stored.

In the storage area of the motion data 14P, motion data 14P1a to 14P1c, 14P2a to 14P2c composed of a series of motions (gestures) for reading replaced graphic data 14Gu1, 14Gu2 are stored.

Here, 3D image generating data representing various motions caused to correspond to movement data on the bones of the hands and feet of a person and on the feature points of the person's face are stored as the replaced graphic data 14Gu1, 14Gu2.

Moreover, movement data and image data on the bones of the hands and feet of a person making the motion and on the feature points of the person's face are stored as the motion data 14P1a to 14P1c, 14P2a to 14P2c.

Figure 5:
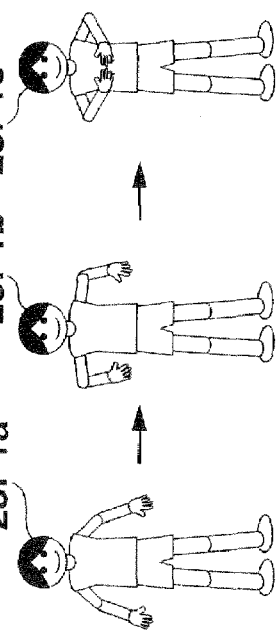
FIG. 5 shows contents previously stored in a special effect graphic data memory 23 of the embodiment.

FIG. 5 shows the contents of data previously stored in the special effect graphic data memory 23.

In the special effect graphic data memory 23, each of a storage area 23a and a storage area 23b stores motion data 23P, replaced graphic data 23Gu, marking data 23Mu, and audio data 23Su in such a manner that the motion data 23P, the replaced graphic data 23Gu, the marking data 23Mu, and the audio data 23Su correspond to one another.

In the storage area of the marking data 23Mu, marking data 23Mu1, 23Mu2 simply representing a plurality of types of replaced graphic data 23Gu1, 23Gu2 are stored.

Stored in the storage area of the motion data 23P are motion data 23P1a to 23P1c, 23P2a to 23P2c composed of a series of motions (gestures) for combining replaced graphic data 23Gu1, 23Gu2 with specific positions of the replace graphic data 14Gu1, 14Gu2.

Here, the replaced graphic data 23Gu1, 23Gu2 are stored in the form of graphic data or 3D image generating data.

Moreover, movement data and image data on the bones of the hands and feet of a person making the motion and on the feature points of the person's face are stored as the motion data 23P1a to 23P1c, 23P2a to 23P2c.

Figure 6:
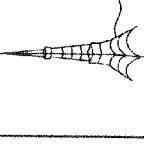
FIG. 6 shows contents previously stored in a replaced graphic data memory (for objects) 15 of the embodiment.

FIG. 6 shows the contents of data previously stored in the replaced graphic data memory (for objects) 15.

In the replaced graphic data memory (for objects) 15, each of a storage area 15a to a storage area 15 stores target image data 15T, replaced graphic data 15G, marking data (before contact) 15M, marking data (after contact) 15M', and audio data 15S in such a manner that the target image data 15T, the replaced graphic data 15G, the marking data (before contact) 15M, the marking data (after contact) 15M', and the audio data 15S correspond to one another. In the storage area of the replaced graphic data 15G, for example, the replaced graphic data 15Ga1 to 15Ga3 before contact, those during contact, and those after contact are stored.

In the audio data 15S, audio data 15Sa is set so that its output timing may be at the time of contact, audio data 15Sb1 is set so that its output timing may be before contact, audio data 15Sb2 is set so that its output timing may be at the time of contact, and audio data 15Sc is set so that its output timing may be after contact.

As for the storage areas of the marking data (before contact) 15M and marking data (after contact) 15M', for example, the storage area 15a stores marking data simply representing the replaced graphic data 1Ga1 and marking data 15Ma' simply representing the replaced graphic data 15Ga3. In the storage area of the target image data 15T, for example, the storage area 15a stores the best angle of target image data (e.g., image data on object A) to be replaced with the replaced graphic data 15Ga1 to 15Ga3.

Here, the replaced graphic data 15Ga1 to 15Ga3, 15Gb1 to 15Gb3, 15Gc1 to 15Gc3 are stored in the form of graphic data or 3D image generating data.

Moreover, the target image data 15T is stored in the form of image data obtained by shooting the object or shape data representing the features of the object.

Figure 7:
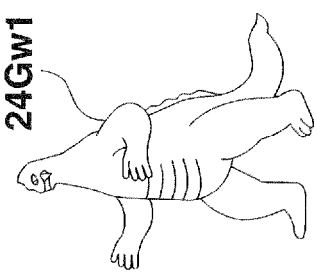
FIG. 7 shows contents previously stored in a replaced graphic data memory (for actors) 24 of the embodiment.
Figure 7:
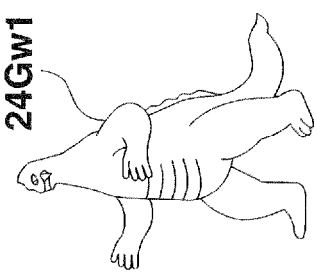
Figure 7:
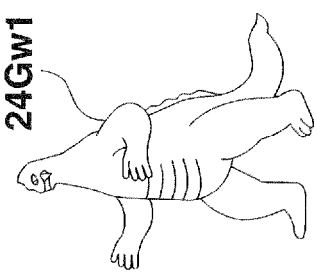
Figure 7:
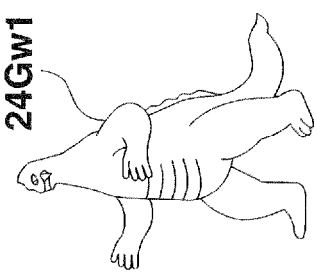
Figure 7:
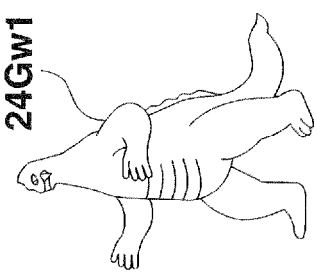
Figure 7:
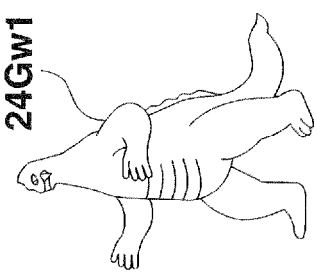

FIG. 7 shows the contents of data stored in the replaced graphic data memory (for actors) 24.

In the replaced graphic data memory (for actors) 24, each of a storage area 24a and a storage area 24b stores target image data 24T the user can register arbitrarily, replaced graphic data (1) 24Gw, marking data (1) 24Mw, replaced graphic data (2) 24Gw', marking data (2) 24Mw', and audio data 24S in such a manner that the target image data 24T, the replaced graphic data 24Gw, the marking data 24Mw, the replaced graphic data 24Gw', the marking data 24Mw', and the audio data 24S correspond to one another.

In a storage area of the replaced graphic data (1) 24Gw, for example, in a storage area 24a, a plurality of types of first-stage replaced graphic data 24Gw1 are stored.

In a storage area of the marking data (1) 24Mw, for example, in a storage area 24a, marking data 24Mw1 simply representing the replaced graphic data 24Gw1 is stored.

In a storage area of the replaced graphic data (2) 24Gw', for example, in a storage area 24a, second-stage replaced graphic data 24Gw1' corresponding to the first-stage replaced graphic data 24Gw1 is stored.

In a storage area of the marking data (2) 24Mw', for example, in a storage area 24a, marking data 24Mw1' simply representing the replaced graphic data 24Gw1' is stored.

In a storage area of the target image data 24T, actor's face image data to be replaced with the replaced graphic data 24Gw1 or 24Gw2 is registered.

In a storage area of the audio data 24S, for example, in a storage area 24a, audio data 24Sw1 is stored so as to correspond to the replaced graphic data 24Gw1 and marking data 24Mw1 and audio data 24Sw1' is stored so as to correspond to the replaced graphic data 24Gw1' and marking data 24Mw1'.

When the shot image data (added marking data) Gm is displayed, or when the composite moving image data GG is displayed, the audio data 24S is output from the audio output unit 13.

The replaced graphic data 24Gw, 24Gw' are stored in the form of graphic data representing various motions or a combination of movement data on the bones of the hands and feet of a person and the feature points of the person's face and 3D image generating data.

Although not described in detail in the embodiment, the change of the first-stage replaced graphic data 24Gw to the second-stage replaced graphic data 24Gw' in display (or composition) can be set arbitrarily. For example, the display may be changed according to the shooting date and time or according to the date and time when the data is reproduced and displayed as composite image data.

Moreover, a plurality of face images differing in expression may be registered in advance as image data to be recognized (on a face image part). Then, for example, replaced graphic data 24Gw may be read for a placid expression and replaced graphic data 24Gw' be read for an angry expression and combined with the original data.

In the shot image data memory 25, a plurality of items of shot image data Gn taken continuously in time by the image pickup unit 21 are stored.

Sequentially Stored in the shot image data memory (added marking data) 26 are the shot image data (added marking data) Gm (see FIG. 2A) created in real time according to an image processing program for a plurality of items of shot image data Gn stored in the shot image data memory 25.

Stored in the composite image data memory 27 is composite image data GG (see FIG. 2B) created according to an image processing program on the basis of the shot image data (added marking data) Gm stored in the shot image data (added marking data) memory 26.

The digital camera 10 adds marking data to a plurality of items of shot image data Gn taken successively by the image pickup unit 21, thereby creating shot image data (added marking data) Gm (see FIG. 2A) in real time and displaying them. Then, the digital camera 10 creates composite image data GG (see FIG. 2B) from the shot image data (added marking data) Gm recorded after shooting and displays it as a moving image or outputs the created moving image to the outside.

Figure 8:
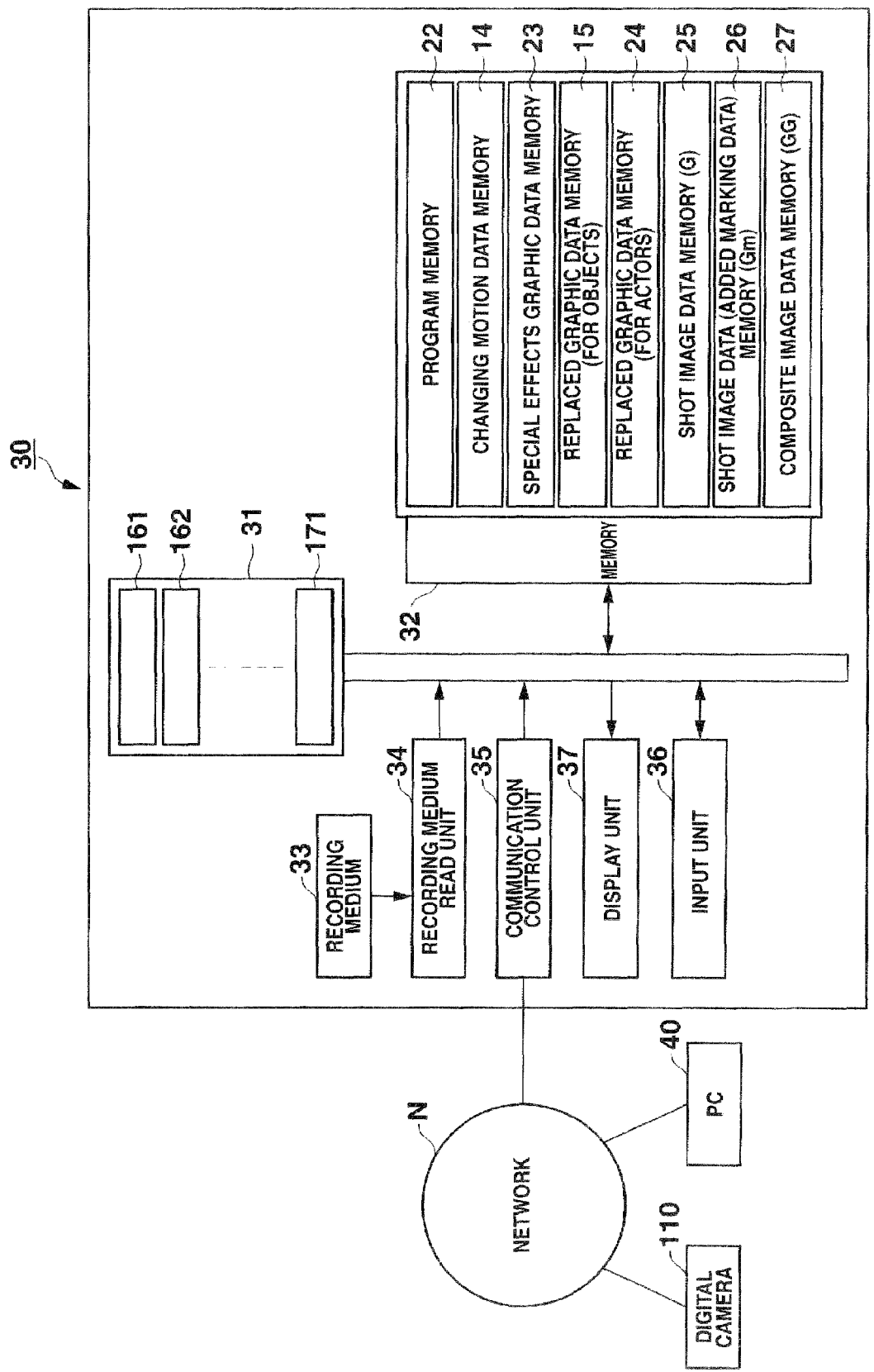
FIG. 8 is a block diagram showing a configuration of the electronic circuit of a server 30 of the embodiment.

Furthermore, as shown in FIG. 8, the server 30 on the network N may be caused to include the aforementioned functions of the digital camera 10.

Moreover, the server 30 may be provided with the function of communicating with a digital camera 110 or a communication terminal 40 via the network N. Then, the server 30 may create shot image data (added marking data) Gm and composite image data GG and provide response-delivery services to the digital camera 110 or the communication terminal 40.

In this case, the server 30 includes a CPU 31, a computer. The CPU 31, which includes processing units similar to the processing units 161 to 171 of the CPU 16 of the digital camera 10, controls the operation of each section of the circuit according to a system program previously stored in a memory 32 or a server control program read into the memory 32 via a recording medium read unit 34, such as an optical disk drive, from an external recording medium 33, such as a CD-ROM.

Connected to the CPU 31 are not only the memory 32 and recording medium read unit 34 but also a communication control unit 35 for controlling data transfer with the digital camera 110 and the communication terminal 40 on the network N, an input unit 36, such as a keyboard or a mouse, and a display unit 37.

A program memory 22 of the memory 32 stores a system program which supervises the overall operation of the server 30, and a communication control program which supervises the operation of communicating with the digital camera 110 and the communication terminal 40. The program memory 22 further stores, in advance, an image processing program which supervises various functions of creating and outputting (distributing) shot image data (added marking data) Gm and composite image data GG as the digital camera 10, on the basis of the shot image data Gn transferred from the digital camera 110 or the communication terminal 40.

Then, each of the various programs stored in the program memory 22 is activated according to an input signal from the input unit 36 or an input signal from the digital camera 110 or the communication terminal 40 via the communication control unit 35.

The memory 32 includes a changing motion data memory 14, a special effect graphic data memory 23, a replaced graphic data memory (for objects) 15, a replaced graphic data memory (for actors) 24, a shot image data memory 25, a shot image data memory (added marking data) 26, a composite image data memory 27, and a working data memory. These data memories store almost the same data as those of the digital camera 10.

With this configuration, on the basis of a plurality of items of shot image data Gn transferred from the digital camera 110 or the communication terminal 40 connected to the network N, the server 30 can riot only create similar shot image data (added marking data) Gm and composite image data GG but also provide response-delivery services to the digital camera 110 and the communication terminal 40 which have transferred the shot image data Gn.

Next, a composite image output process at the CPU 16 of the digital camera 10 or at the CPU 31 of the server 30 will be explained.

Figure 9:
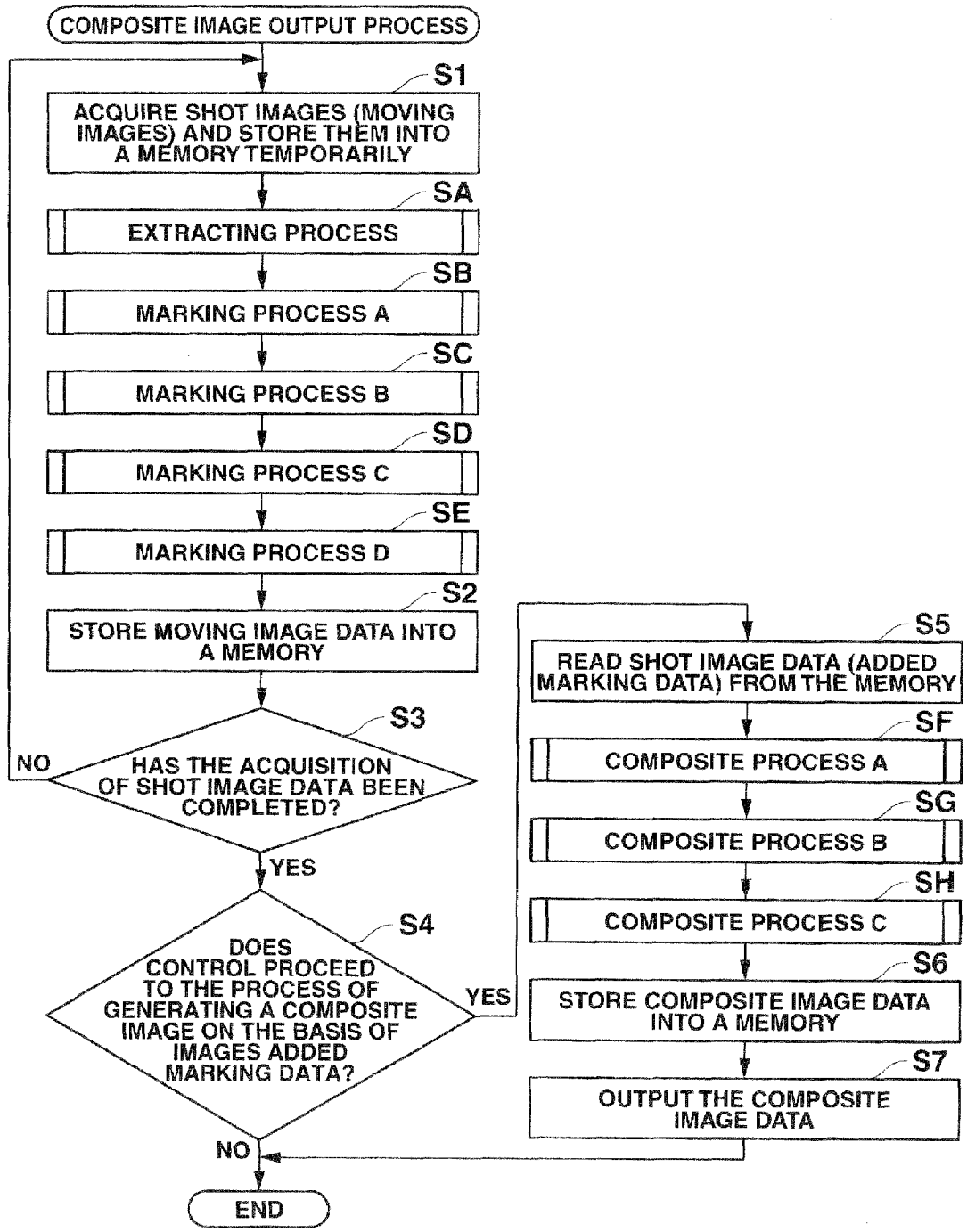
FIG. 9 is a flowchart to help explain all the steps of a composite image output process of the embodiment.

FIG. 9 is a flowchart to help explain all the steps of the composite image output process.

Figure 10:
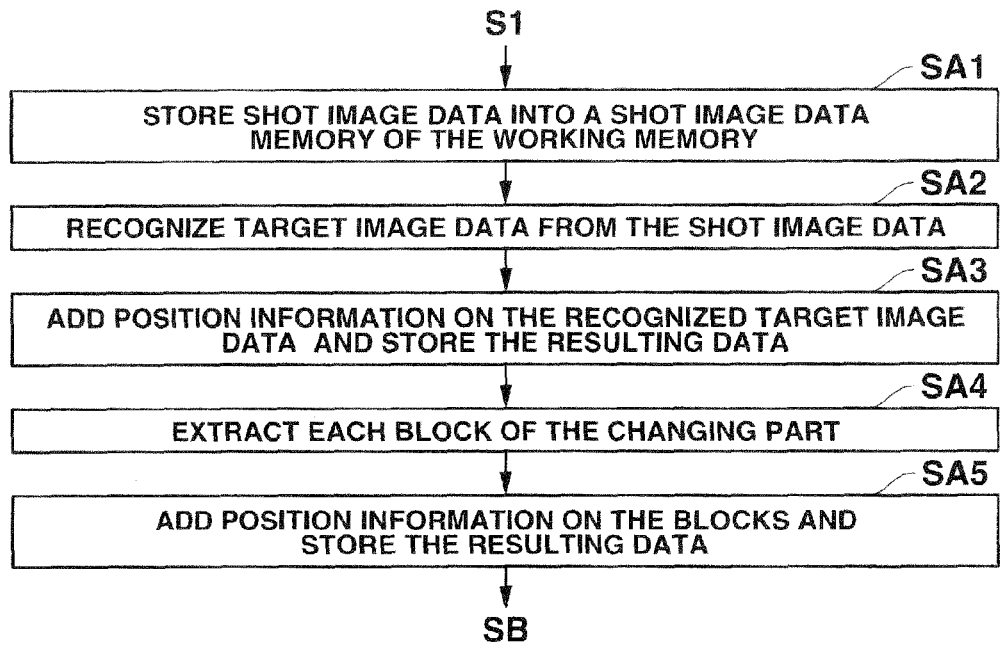
FIG. 10 is a sub-flowchart to help explain the process in step SA of FIG. 9.

FIG. 10 is a sub-flowchart to help explain step SA in the flowchart of FIG. 9, that is, the process of extracting target image data from shot image data Gn (G1 to G9).

Figure 11:
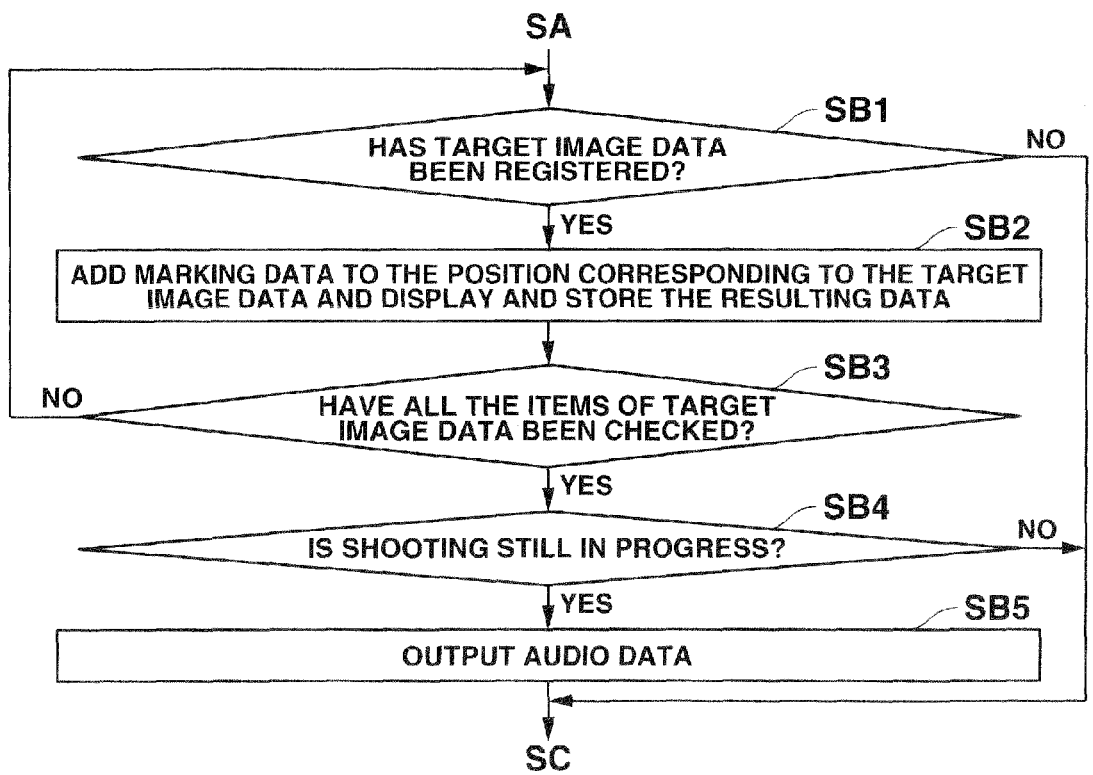
FIG. 11 is a sub-flowchart to help explain the process in step SB of FIG. 9.

FIG. 11 is a sub-flowchart to help explain step SB in the flowchart of FIG. 9, that is, a marking process A of adding marking data 24Mw to the target image data extracted in step SA and displaying the resulting data.

Figure 12:
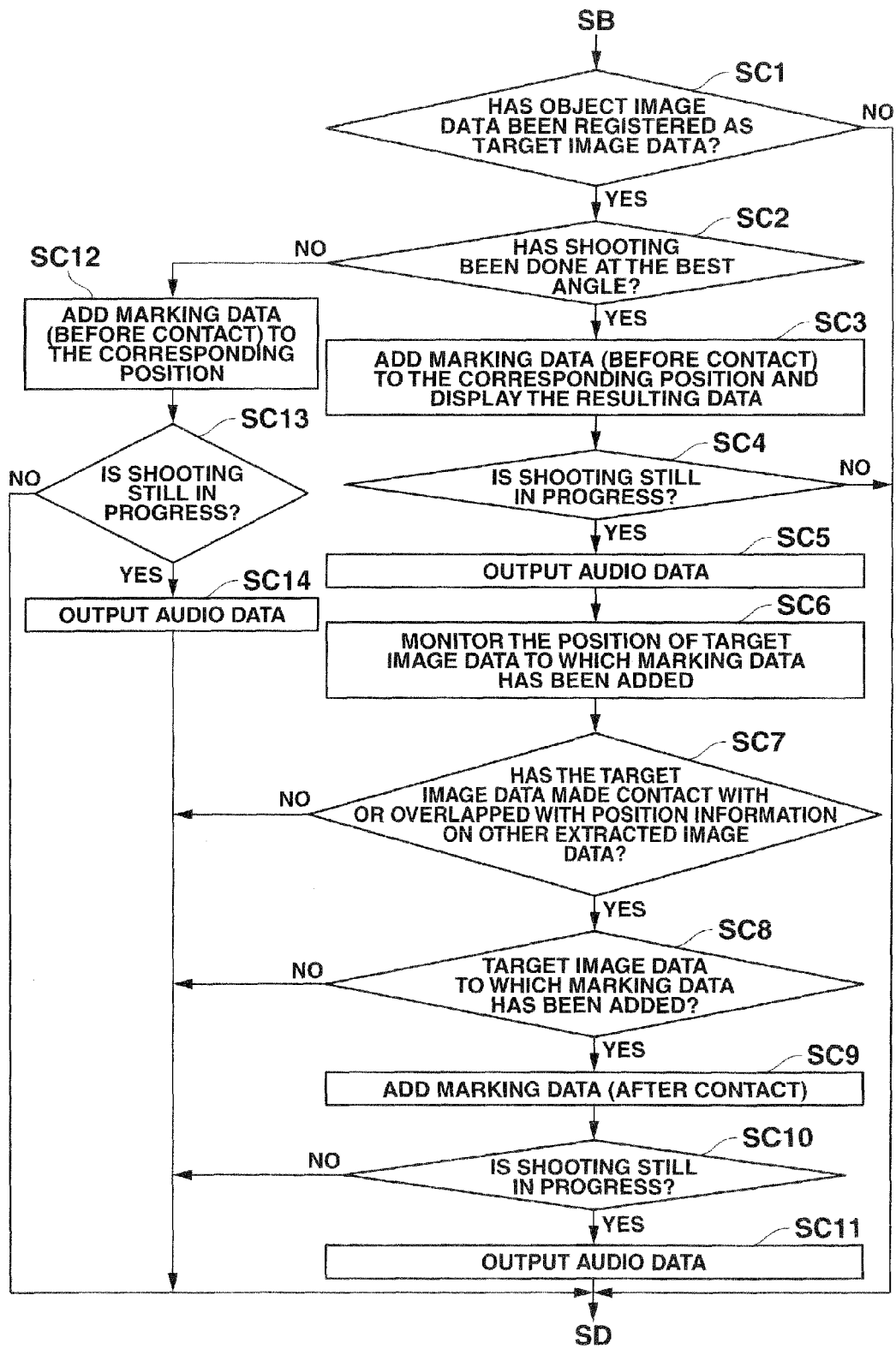
FIG. 12 is a sub-flowchart to help explain the process in step SC of FIG. 9.

FIG. 12 is a sub-flowchart to help explain step SC in the flowchart of FIG. 9, that is, a marking process B of not only adding marking data 15M, 15M' to the target image data extracted in step SA and displaying the resulting data but also outputting audio data 15S.

Figure 13:
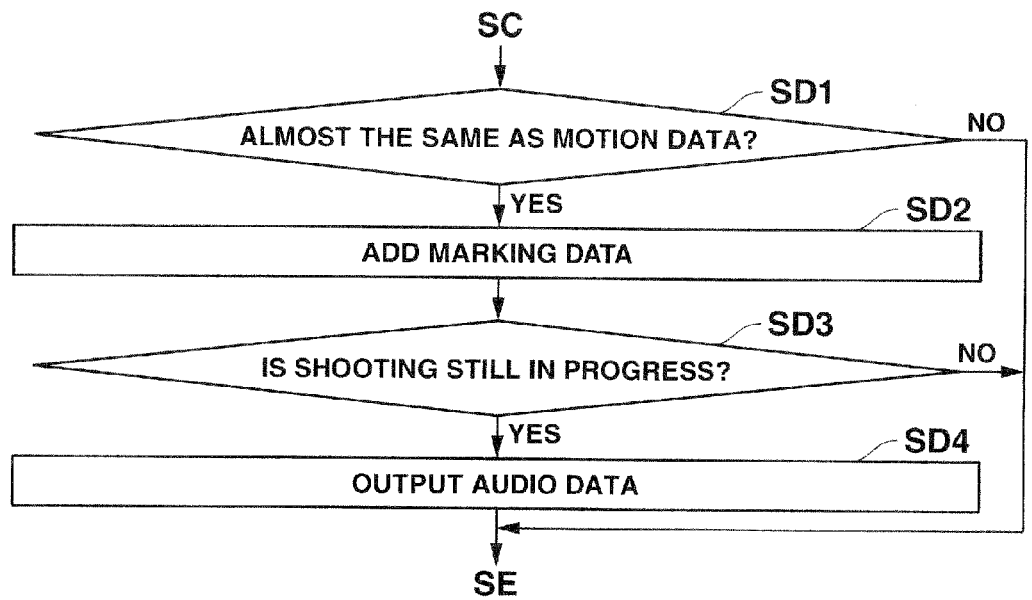
FIG. 13 is a sub-flowchart to help explain the process in step SD of FIG. 9.

FIG. 13 is a sub-flowchart to help explain step SD in the flowchart of FIG. 9, that is, a marking process C of detecting a gesture (or a motion) over a plurality of items of shot image data Gn in the target image data extracted in step SA and, if it has been determined that the motion is almost the same as the motion data 14P registered in the changing motion data memory 14, adding marking data 14Mu to the target image data, displaying the resulting data, and outputting corresponding audio data 14Su.

Figure 14:
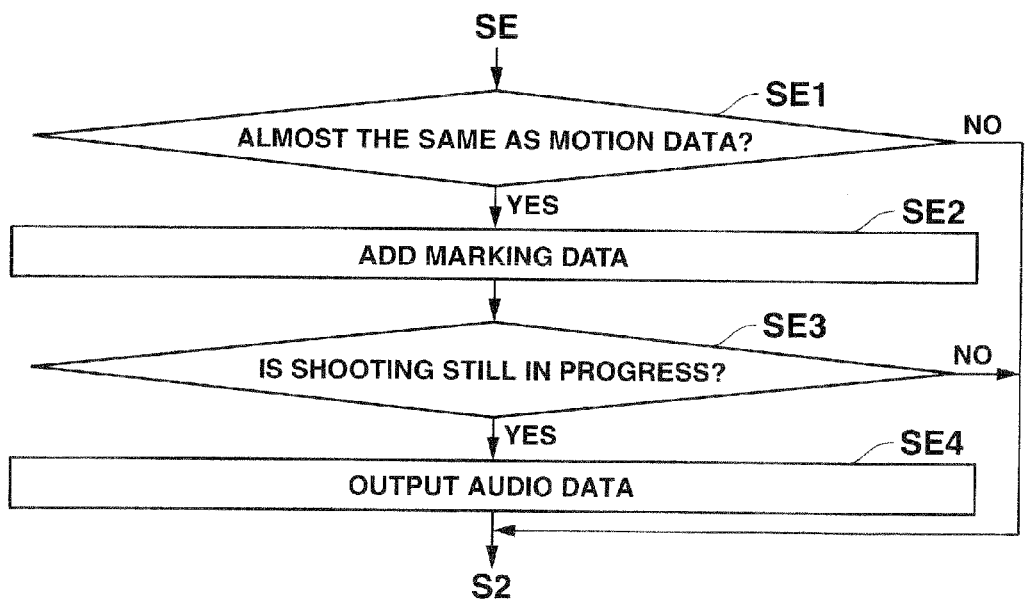
FIG. 14 is a sub-flowchart to help explain the process in step SE of FIG. 9.

FIG. 14 is a sub-flowchart to help explain step SE in the flowchart of FIG. 9, that is, a marking process D of detecting a gesture (or a motion) over a plurality of items of shot image data Gn in the target image data subjected to the marking process in step SD and, if it has been determined that the motion is almost the same as a motion data 23P registered in the special effect graphic data memory 23, further adding marking data 23Mu to the actor's image data, displaying the resulting data, and outputting corresponding audio data 23Su.

Figure 15:
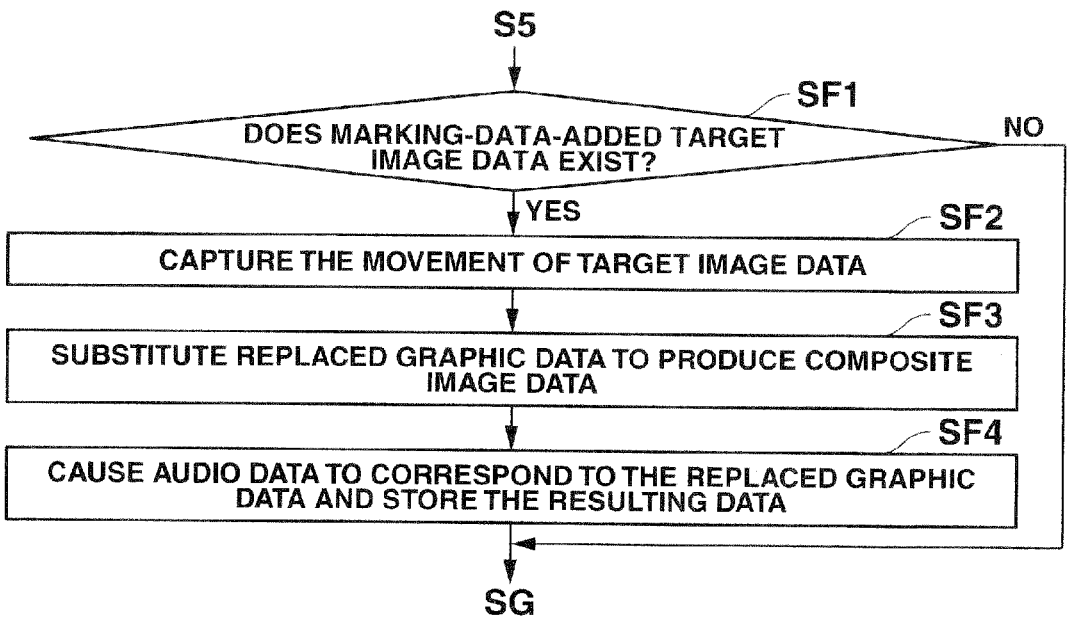
FIG. 15 is a sub-flowchart to help explain the process in step SF of FIG. 9.

FIG. 15 is a sub-flowchart to help explain step SF in the flowchart of FIG. 9, that is, a composite process A of substituting replaced graphic data 24Gw, 14Gu for the target image data added with marking data 24Mw, 14Mu in a composite image output process to produce composite image data and setting the output of audio data 24Sw, 14Su.

Figure 16:
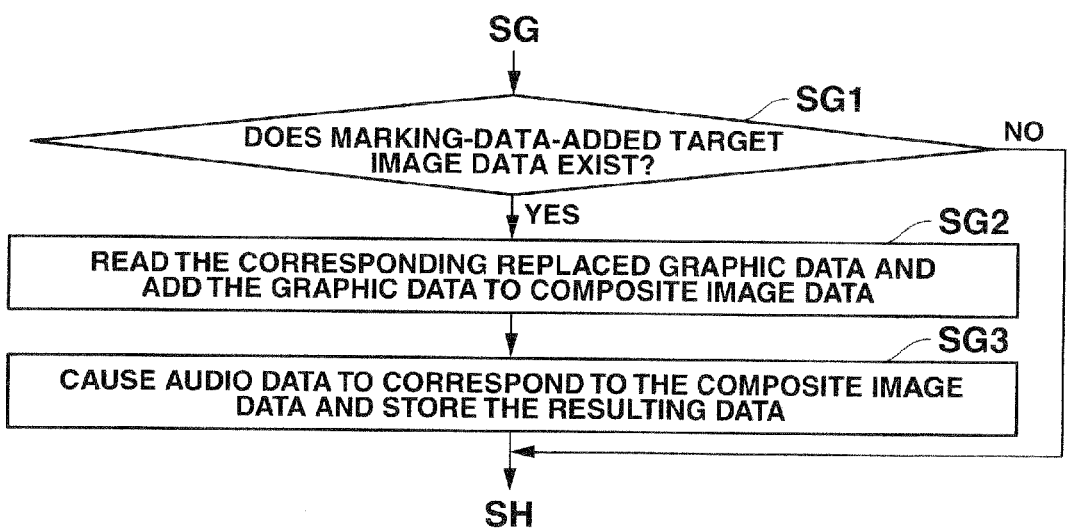
FIG. 16 is a sub-flowchart to help explain the process in step SG of FIG. 9.

FIG. 16 is a sub-flowchart to help explain step SG in the flowchart of FIG. 9, that is, a composite process B of substituting replaced graphic data 15G for the target image data added with marking data 15M, 15M' in a composite image data output process to produce a composite image and setting the output of audio data 15S.

Figure 17:
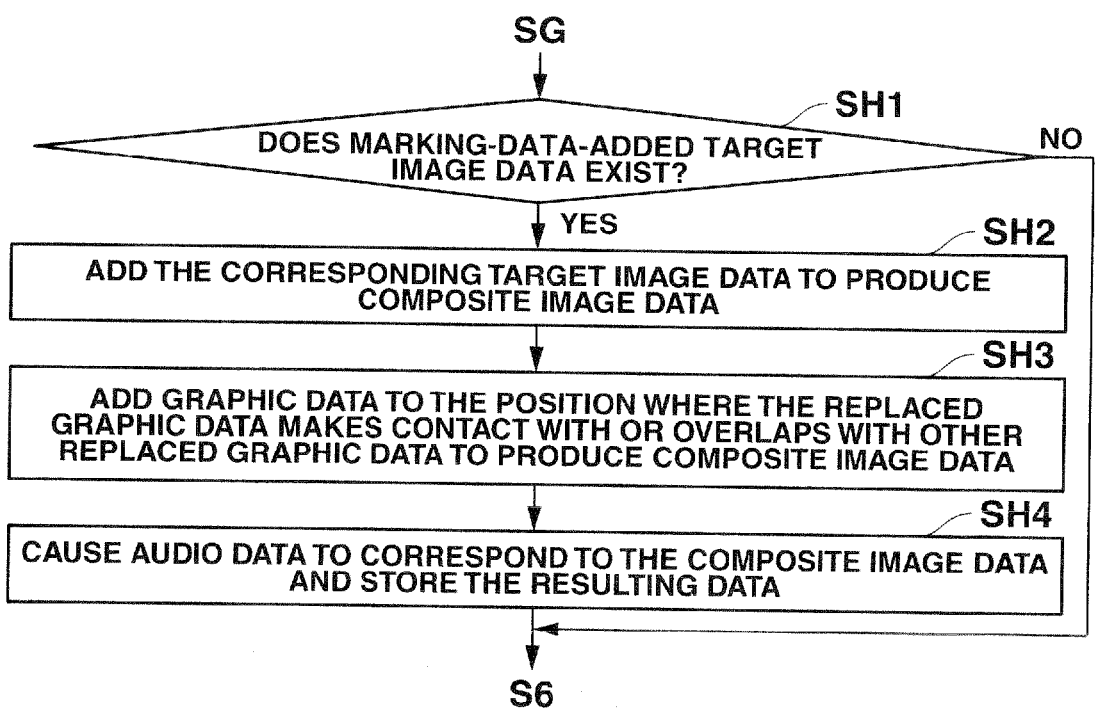
FIG. 17 is a sub-flowchart to help explain the process in step SH of FIG. 9.

FIG. 17 is a sub-flowchart to help explain step SH in the flowchart of FIG. 9, that is, a composite process C of adding replaced graphic data 23Gu to a specific position of the target image data added with marking data 23Mu in a composite image data output process to produce a composite image and setting the output of audio data 23Su.

FIGS. 18 to 26 sequentially show the image processing states on the basis of the shot image data Gn in the composite image output process. In FIGS. 18 to 26, A indicates shot image data Gn, B represents shot image data (added marking data) Gm, and C shows composite image data GG.

As shown in FIGS. 18A to 26A, the processes in steps S1 to S3 of FIG. 9 are executed as a result of the acquisition of shot image data Gn (G1 to G9). Then, shot image data (added marking data) Gm (Gm1 to Gm9) are created and output sequentially as shown in FIGS. 18B to 26B.

Furthermore, as shown in FIGS. 18B to 26B, the processes in steps S4 to S7 of FIG. 9 are performed on the shot image data (added marking data) Gm, thereby creating composite image data GG (GG1 to GG9) as shown in FIGS. 18C to 26C.

When the image pickup unit 21 of the digital camera 10 shoots a series of scenes shown in, for example, FIGS. 18A to 26A, a plurality of items of shot image data Gn (G1 to G9) are stored sequentially into the shot image data memory 25 temporarily (step S1). Then, the sub-flowchart of the extracting process shown in FIG. 10 is executed (step SA).

Extracting Process

The CPU 16 temporarily transfers the shot image data Gn sequentially stored in the shot image data memory 25 to a working memory of the CPU 16 and stores them in the memory (step SA1). Then, the extracting unit 161 recognizes target image data 15T, 24T for the shot image data Gn (step SA2), adds position information on the recognized target image data in the shot image data Gn to the shot image data Gn, and stores the resulting data into the shot image data memory 25 (step SA3).

Then, the variation between the preceding shot image data Gn-1 and the present shot image data Gn is blocked and extracted (step SA4). Then, position information on the image data which has the blocked variation is added to the shot image data Gn and the resulting data is stored into the shot image data memory 25 (step SA5)

Marking Process A

After the target image data existing in the shot image data Gn is extracted in the extracting process (step SA), the first determining unit 162 and first marking unit 163 execute the sub-flowchart of the marking process A shown in FIG. 11 (step SB).

In the marking process A, whether the target image data extracted in the extracting process has been registered in the replaced graphic data memory (for actors) 24 as target image data 24T is determined using a known face image recognizing process (step SB1).

If it has been determined that the target image data has been registered as the target image data 24T (Yes in step SB1), the marking data 24Mw1 in the storage area 24a stored so as to correspond to the target image data 24T is read and further added to the position of the face image in the corresponding extracted target image data. The resulting data is then displayed and is temporarily stored into the working memory as shot image data (added marking data) Gm1 to Gm9 as shown in FIGS. 18B to 26B (step SB2).

At this time, the marking data 24Mw1 may be displayed so as to overlap with the face part of the extracted target image data or be near the face part.

Then, it is determined whether all of the target image data items have been determined. If all of them have not been determined (No in step SB3), control returns to step SG1. If all of them have been determined (Yes in step SB3), control proceeds to the process in step SB4.

Then, if it has been determined that shooting is now in progress with the digital camera 10 (Yes in step SB4), the audio data 24Sw1 stored in the replaced graphic data memory (for actors) 24 is read and output from the audio output unit 13 (step SB5).

Next, the sub-flowchart of the marking process B shown in FIG. 12 is executed (step SC).

Marking Process B

In the marking process B, the second marking unit 164 determines whether the target image data extracted in the extracting process has been registered in the replaced graphic data memory (for objects) 15 as target image data 15T (step SC1).

If in step SC1, it has been determined that the target image data has been registered as target image data 15T (Yes in step SC1), the second marking unit 164 determines whether the extracted target image data has been obtained by shooting at the best angle (step SC2). If it has been determined that it has been obtained by shooting at the best angle (Yes in step SC2), the marking data (before contact) 15M stored so as to correspond to the target image data 15T is read and added to the position of the corresponding extracted target image data and the resulting data is displayed (step SC3).

Figure 18A:
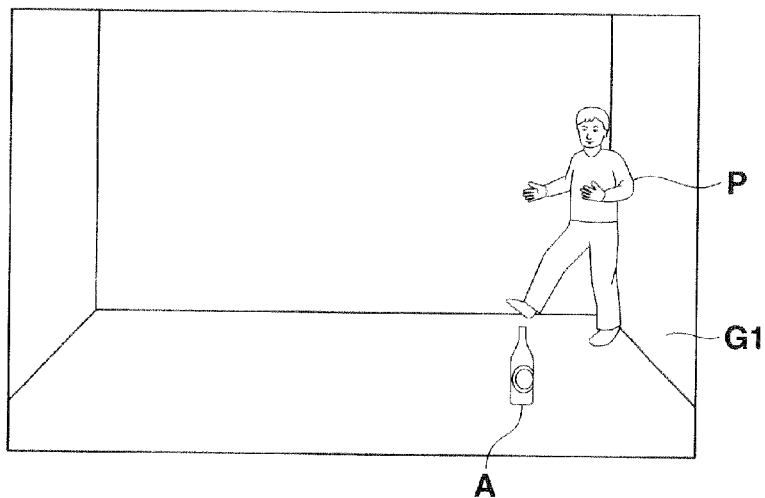
FIG. 18A shows shot image data G1.
Figure 19A:
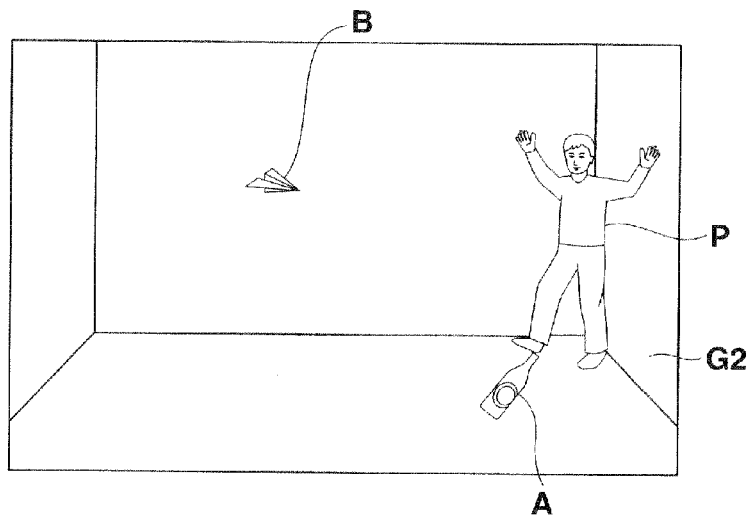
FIG. 19A shows shot image data G2.

For example, the extracted target image data corresponding to object A and object B shown in FIGS. 18A and 19A are almost in the same state as the target image data 15T at the best angle registered in the replaced graphic data memory (for objects) 15.

Figure 18B:
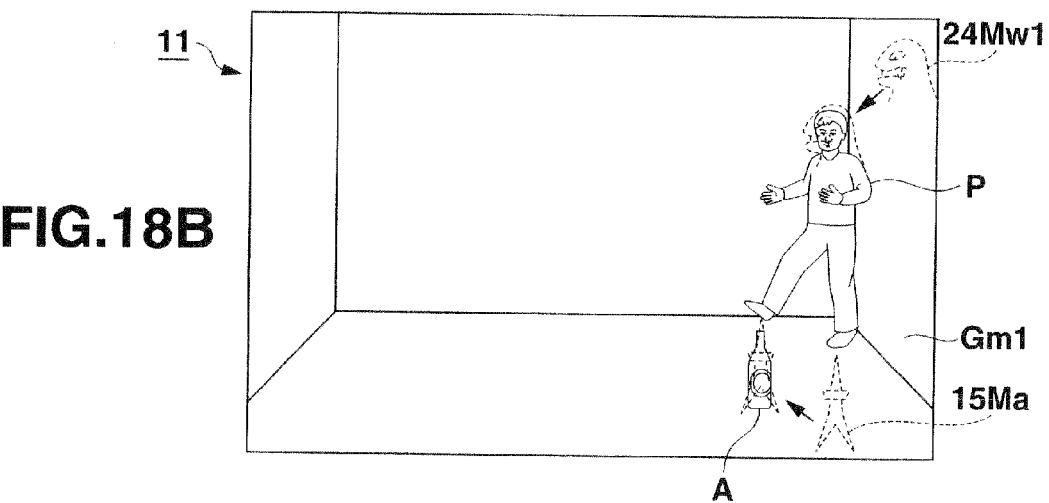
FIG. 18B shows shot image data (added marking data) Gm1.
Figure 18C:
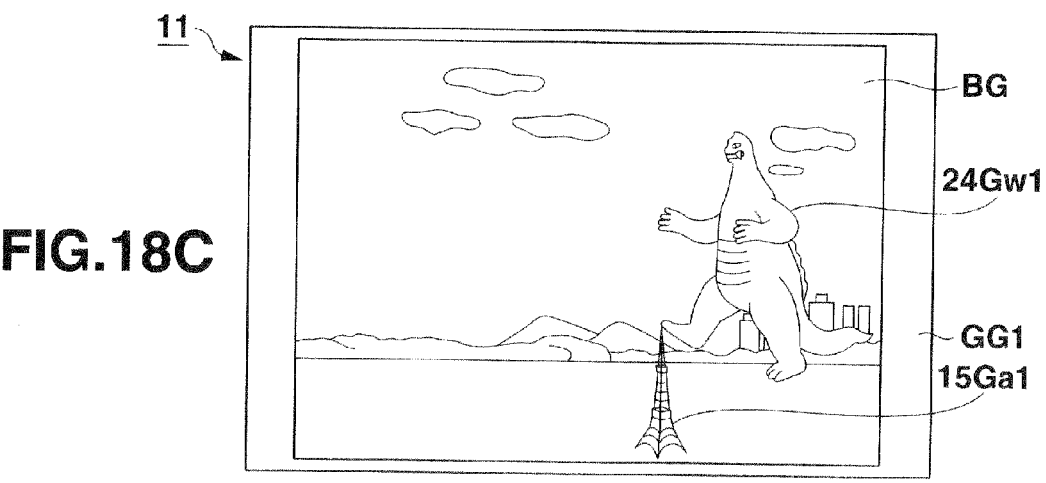
FIG. 18C shows composite image data GG1 in the embodiment.
Figure 19B:
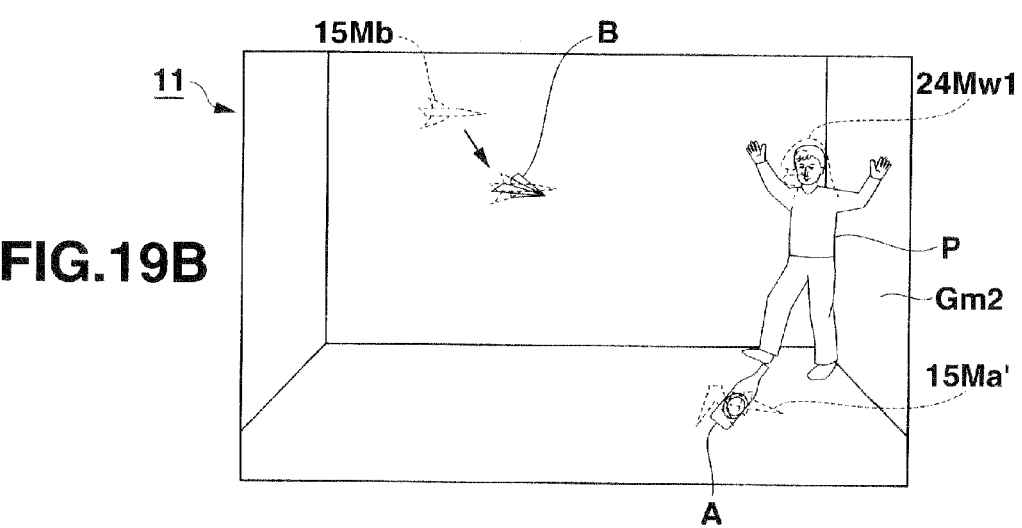
FIG. 19B shows shot image data (added marking data) Gm2.
Figure 19C:
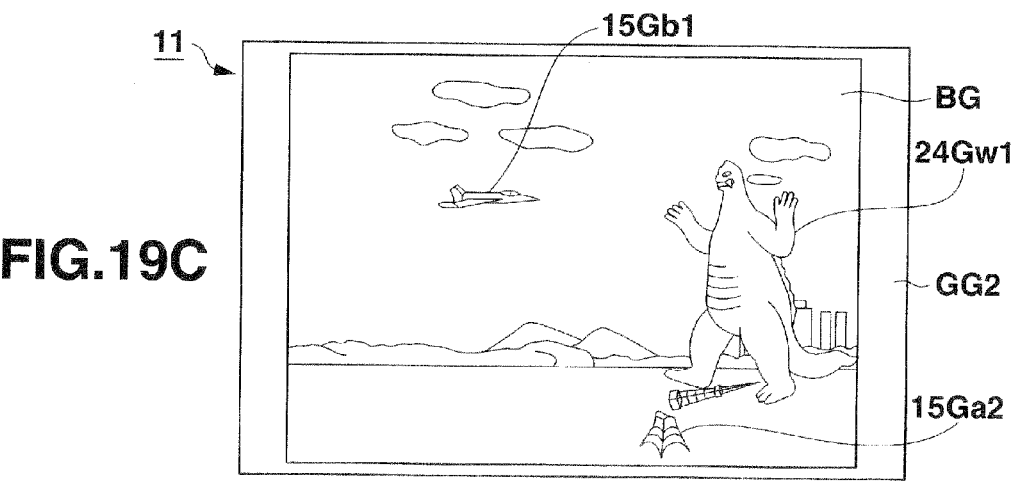
FIG. 19C shows composite image data GG2 in the embodiment.

Therefore, the marking data (before contact) 15Ma stored so as to correspond to the target image data 15T and the marking data (before contact) 15Mb are read and, at the same time, are added to the position of the extracted target image data as shown by the shot image data Gm1, Gm2 in FIGS. 18B and 19B, respectively.

At this time, the marking data (before contact) 15Ma and marking data (before contact) 15Mb may be displayed so as to be either overlapped with the extracted target image data or placed near the target image data.

Then, if it has been determined that shooting is now in progress with the digital camera 10 (Yes in step SC4), the audio data 15S stored in the replaced graphic data memory (for objects) 15 is read and output from the audio output unit 13 (step SC5).

Thereafter, the second determining unit 165 monitors the positional relationship between the marking-data-added target image data and other extracted target image data on the basis of the position information added to both of the target image data (step SC6). Then, the second determining unit 165 determines whether the target image data either makes contact with or overlaps with the other extracted target image data (step SC7).

Figure 20A:
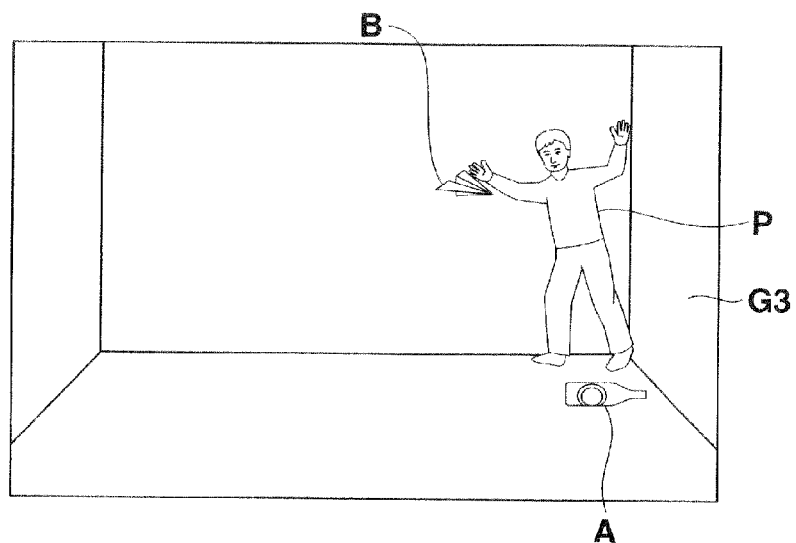
FIG. 20A shows shot image data G3.
Figure 20B:
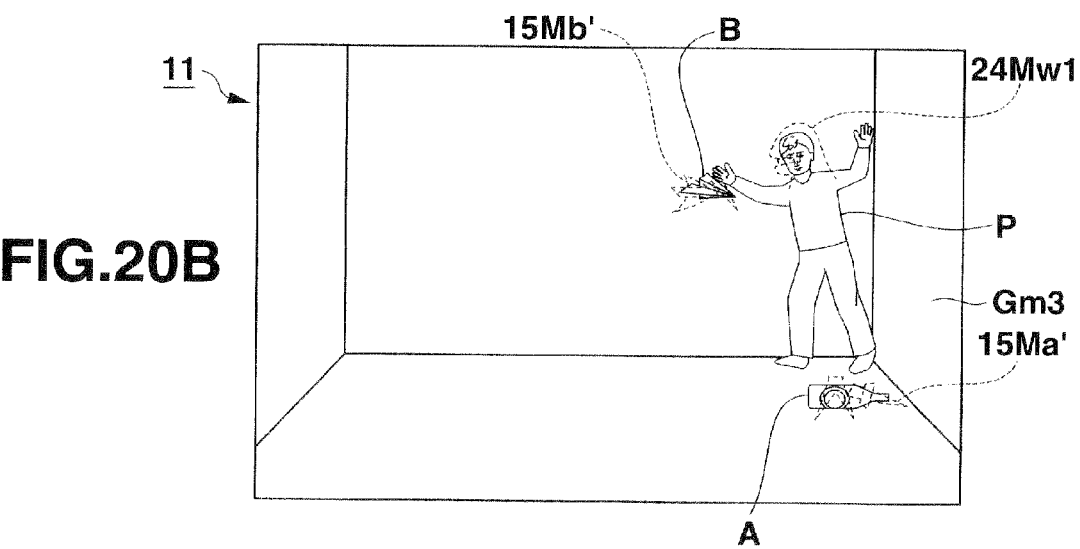
FIG. 20B shows shot image data (added marking data) Gm3.
Figure 20C:
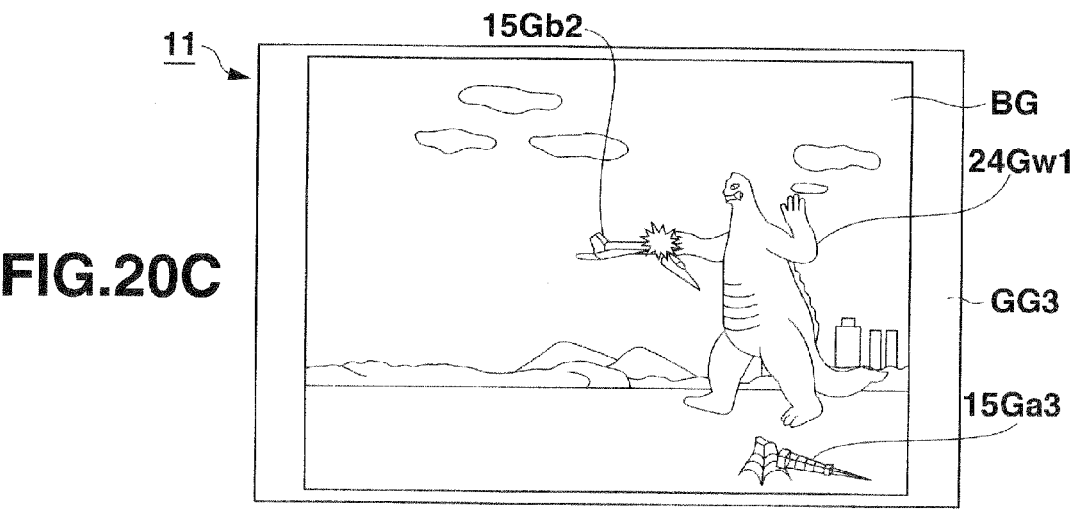
FIG. 20C shows composite image data GG3 in the embodiment.

More specifically, in FIG. 19A, it is determined whether the target image data corresponding to object A makes contact with or overlaps with the target image data corresponding to actor P. In FIG. 20A, it is determined whether the target image data corresponding to object B makes contact with or overlaps with the target image data corresponding to actor P.

If it has been determined that position information on the target image data makes contact with or overlaps with position information on the other extracted target image data (Yes in step SC7), it is determined whether or not the other extracted target image data is a part of the target image data to which the marking data 24M has been added in the marking process A (step SC8).

More specifically, for in FIG. 19A, it is determined whether the marking data (1) 24Mw1 has been added to the target image data corresponding to actor P.

If in step SC8, it has been determined that it is a part of the other extracted target image data to which the marking data 24MW has been added (Yes in step SC8), the third making unit 166 reads marking data (after contact) 15M', substitutes the marking data 15M' for the marking data (before contact) 15M added in step SC3, stores the resulting data into the working data memory temporarily, and displays the shot image data (added marking data) Gm (step SC9).

The process in step SC9 will be explained using FIG. 19B. The marking data (after contact) 15Ma' stored so as to correspond to the target image data 15T is read and added to the position of the marking data (before contact) 15Ma, and substituted for the marking data (before contact) 15Ma, and the resulting data is stored into the working data memory temporarily, and the data is displayed on the display unit 11 (step SC9).

Then, if it has been determined that shooting is now in progress with the digital camera 10 (Yes in step SC10), the audio data 15S stored so as to correspond to the target image data 15T is read and output from the audio output unit 13 (step SC11).

In step SC2, if has been determined that the extracted target image data has not been picked up at the best angle (No in step SC2), the marking data (after contact) 15M' stored so as to correspond to the target image data 15T is read and added to the position of the corresponding extracted target image data and the resulting data is displayed (step SC12).

Then, if it has been determined that shooting is now in progress with the digital camera 10 (Yes in step SC13), the audio data 15S stored so as to correspond to the target image data 15T is read and output from the audio output unit 13 (step SC14).

Next, the sub-flowchart of the marking process C shown in FIG. 13 is executed (step SD).

Marking Process C

In the marking process C, the third determining unit 167 determines whether the target image data extracted in the extracting process has moved over a plurality of items of shot image data Gn and its movement (or motion) is almost the same as the motion data 14P previously stored in the changing motion data memory 14 (step SD1).

Figure 21A:
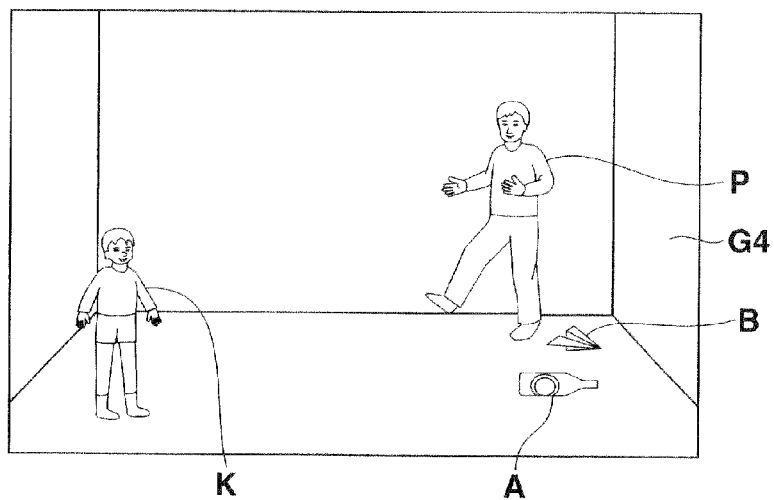
FIG. 21A shows shot image data G4.
Figure 21B:
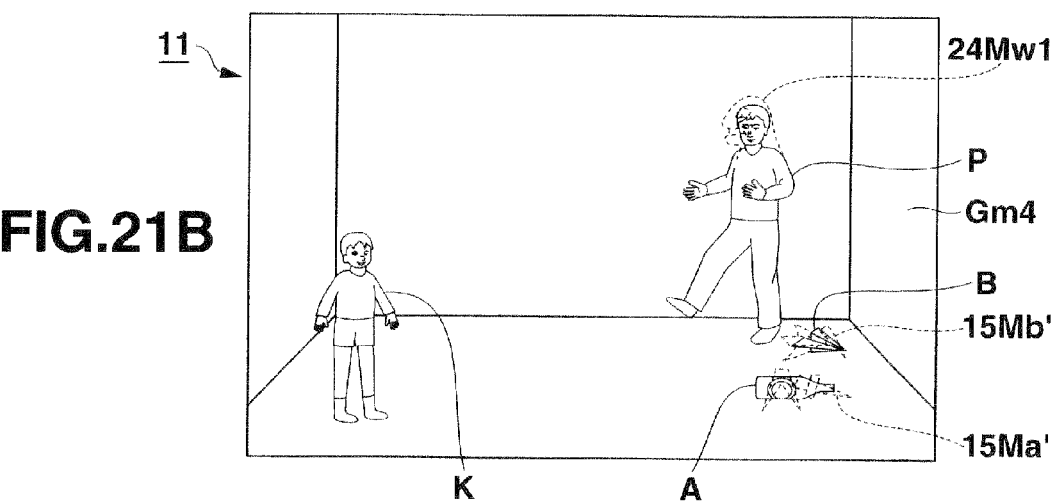
FIG. 21B shows shot image data (added marking data) Gm4.
Figure 21C:
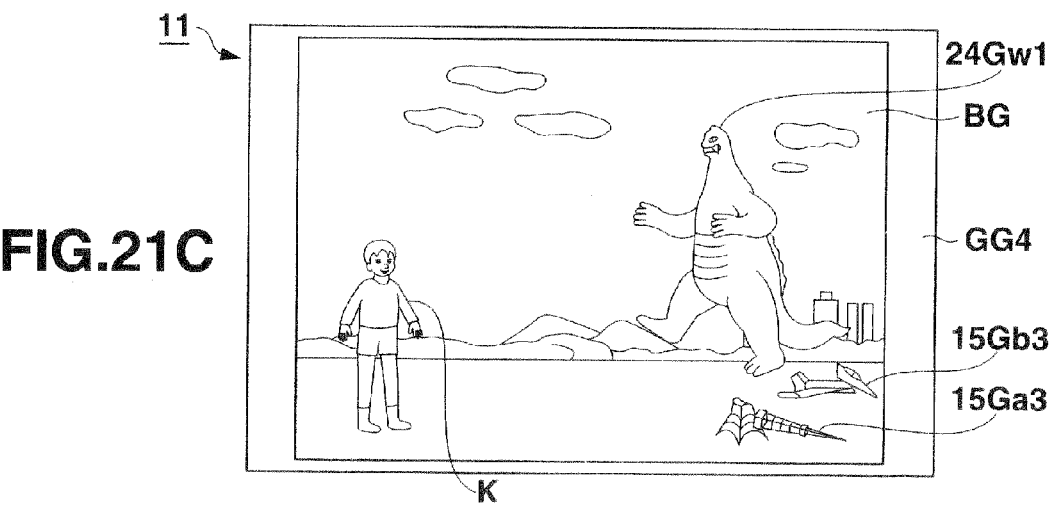
FIG. 21C shows composite image data GG4 in the embodiment.
Figure 22A:
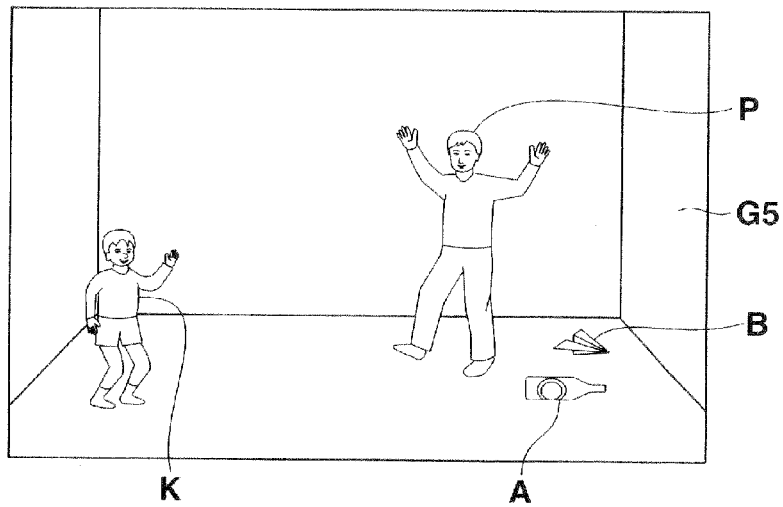
FIG. 22A shows shot image data G5.
Figure 22B:
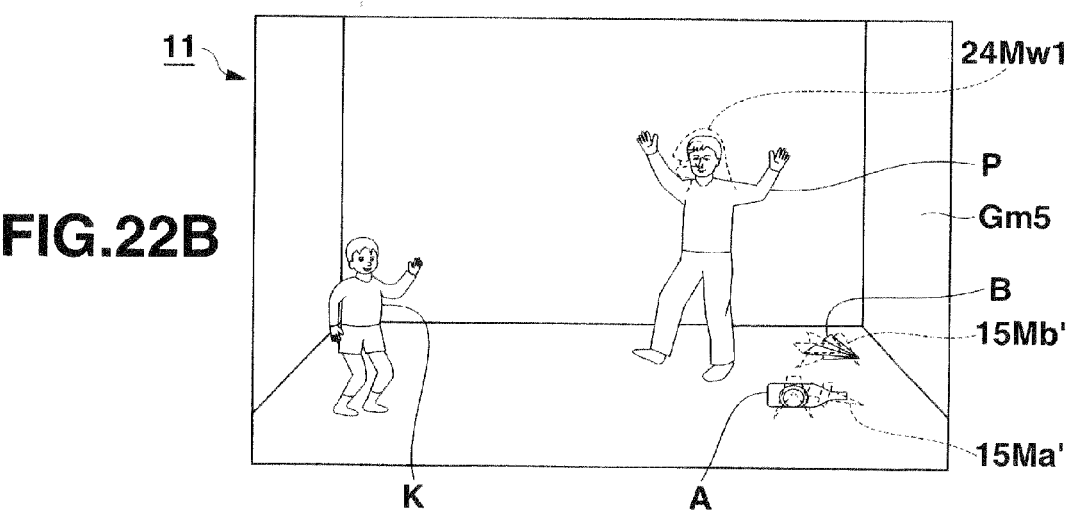
FIG. 22B shows shot image data (added marking data) Gm5.
Figure 22C:
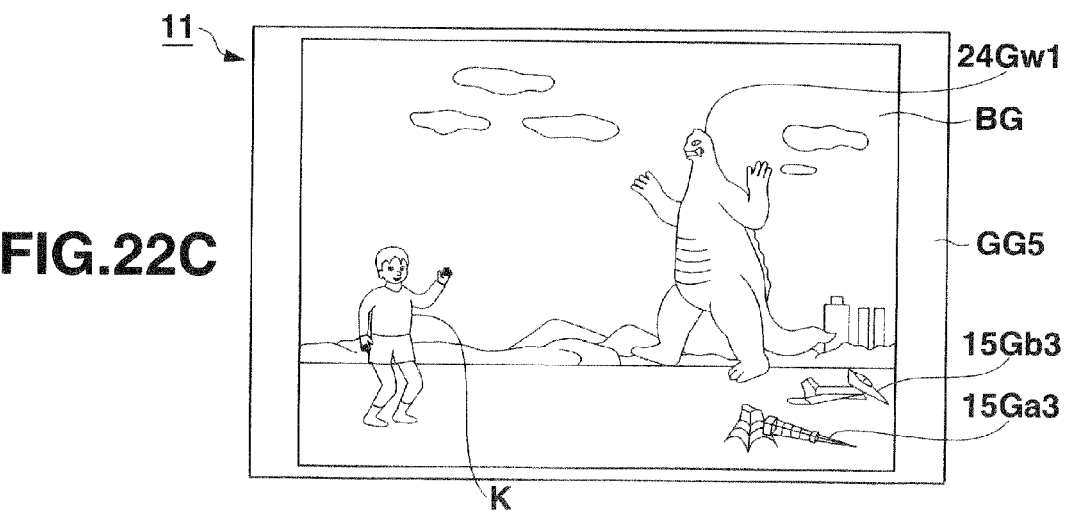
FIG. 22C shows composite image data GG5 in the embodiment.

Step SD1 will be explained using FIGS. 21 to 23.

As shown in FIGS. 21A to 23A, it is determined whether the motion of the target image data corresponding to actor K is almost the same as the motion data 14P (14P1a to 14P1c) previously stored in the changing motion data memory 14.

If it has been determined that the motion is almost the same as the motion data 14P (Yes in step SD1), the fourth marking unit 168 reads the marking data 14Mu stored so as to correspond to the motion data 14P, adds the marking data 14Mu to the image of the face part of the extracted target image data, displays the resulting data, and stores the data into the working memory temporarily as shot image data (added marking data) Gm6 to Gm9 as shown in FIGS. 23B to 26B (step SD2).

At this time, the marking data 14Mu1 may be displayed so as to either overlap with or be placed near the face part of the extracted target image data.

Then, if it has been determined that shooting is now in progress with the digital camera 10 (Yes in step SD3), the audio data 14Su stored so as to correspond to the motion data 14P is read and output from the audio output unit 13 (step SD4).

Next, the sub-flowchart of the marking process D shown in FIG. 14 is executed (step SE).

Marking Process D

In the marking process D, the third determining unit 167 determines whether the target image data to which making data has been added in the marking process C has moved over a plurality of items of shot image data Gn and the movement (or motion) of the target image data is almost the same as the motion data previously stored in the special effect graphic data memory 23 (step SE1).

Figure 24A:
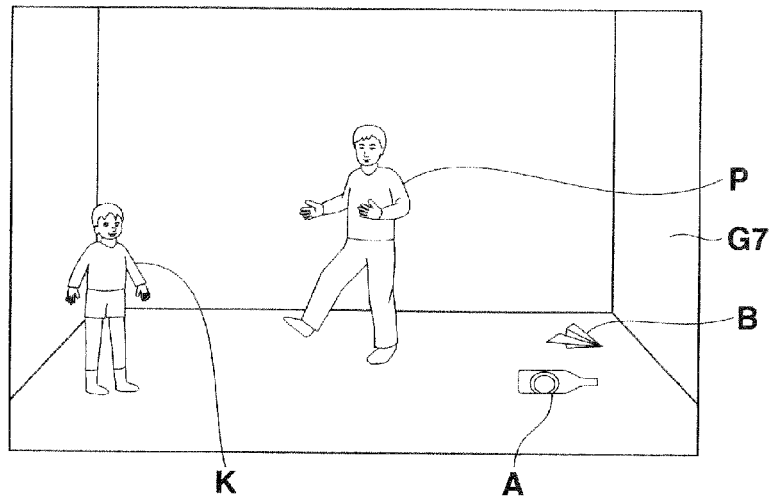
FIG. 24A shows shot image data G7.
Figure 24B:
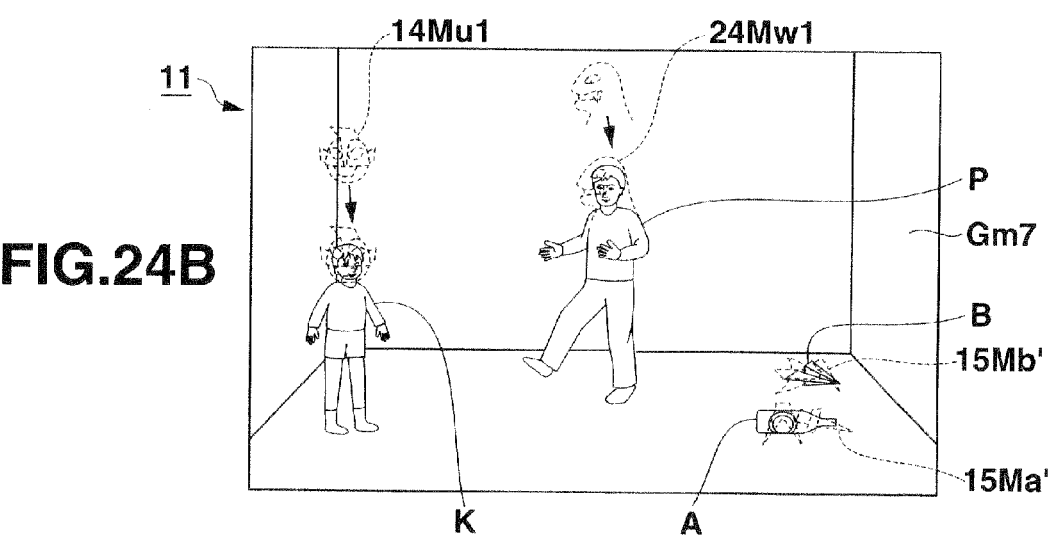
FIG. 24B shows shot image data (added marking data) Gm7.
Figure 24C:
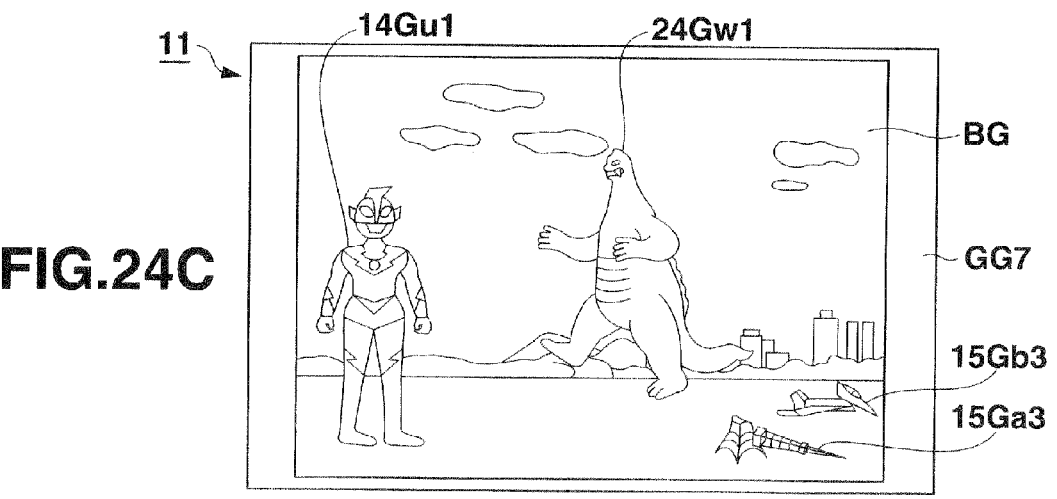
FIG. 24C shows composite image data GG7 in the embodiment.
Figure 25A:
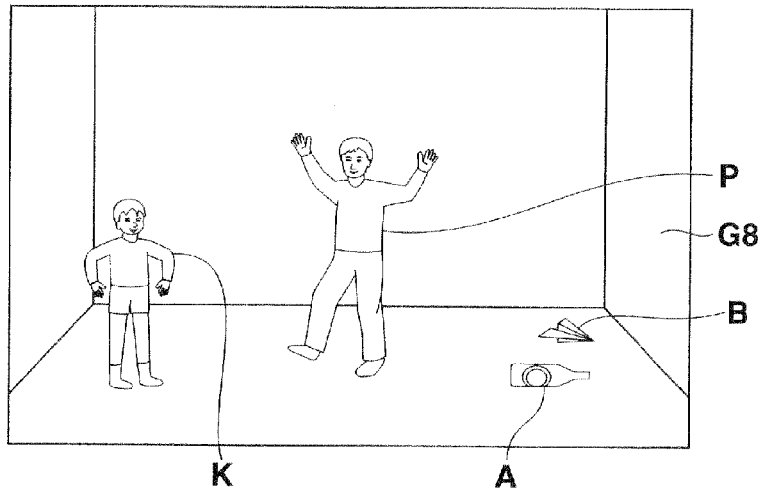
FIG. 25A shows shot image data G8.
Figure 25B:
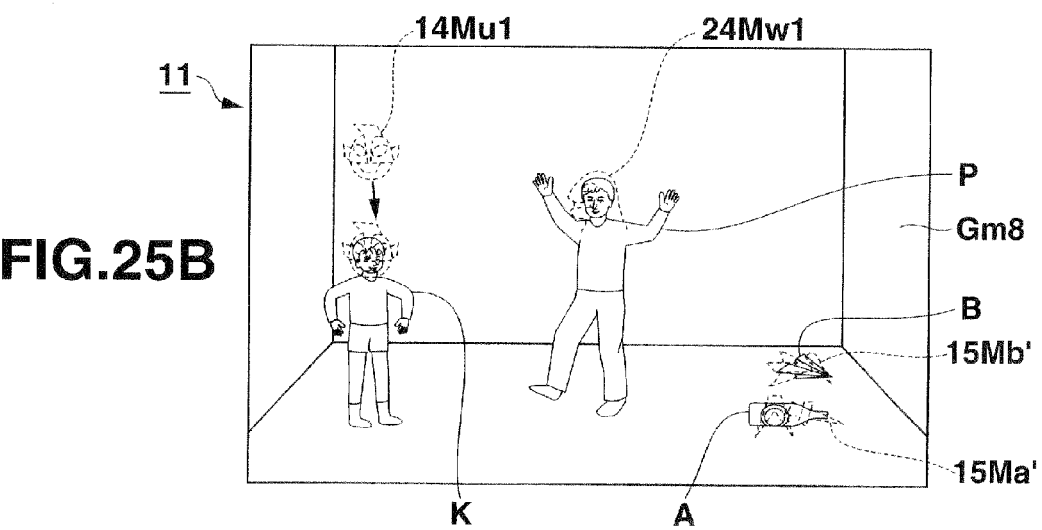
FIG. 25B shows shot image data (added marking data) Gm8.
Figure 25C:
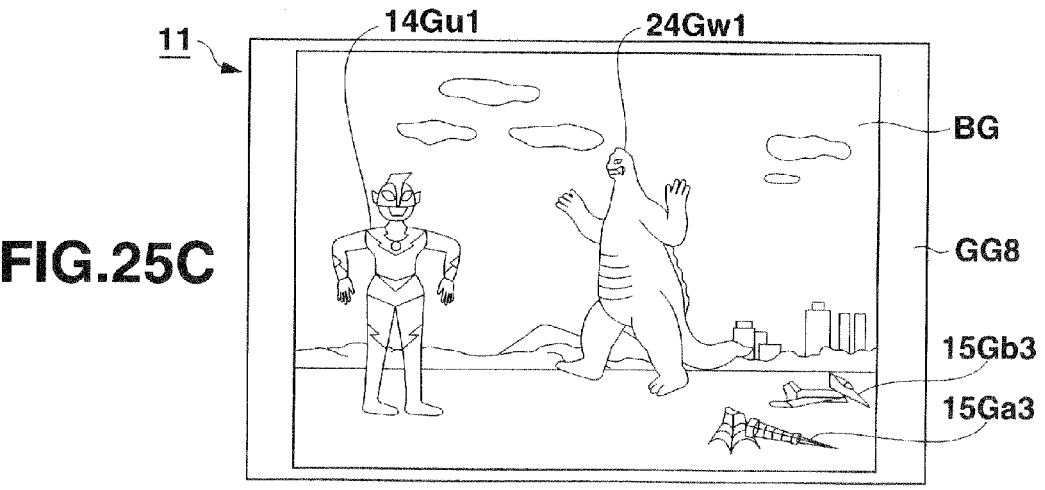
FIG. 25C shows composite image data GG8 in the embodiment.

Step SE1 will be explained using FIGS. 24 to 26.

As shown in FIGS. 24B to 26B, it is determined whether the motion of the target image data to which the marking data 14Mu has been added is almost the same as the motion data 23P (23P1a to 23P1c) previously stored in the special effect graphic data memory 23.

Figure 26A:
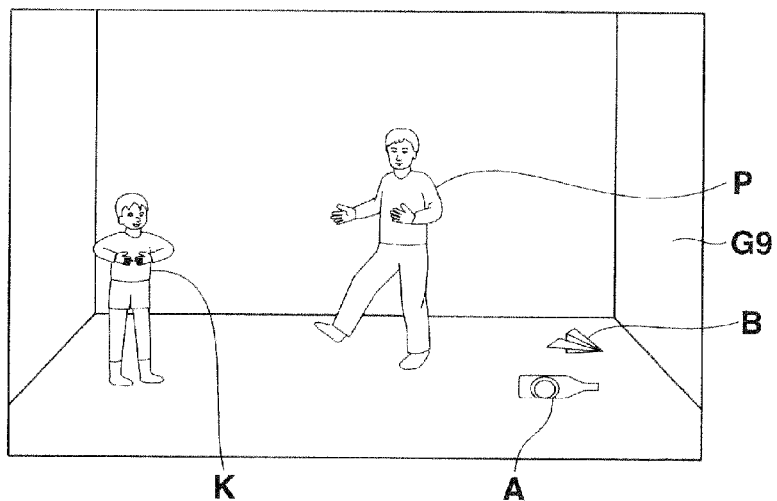
FIG. 26A shows shot image data G9.
Figure 26B:
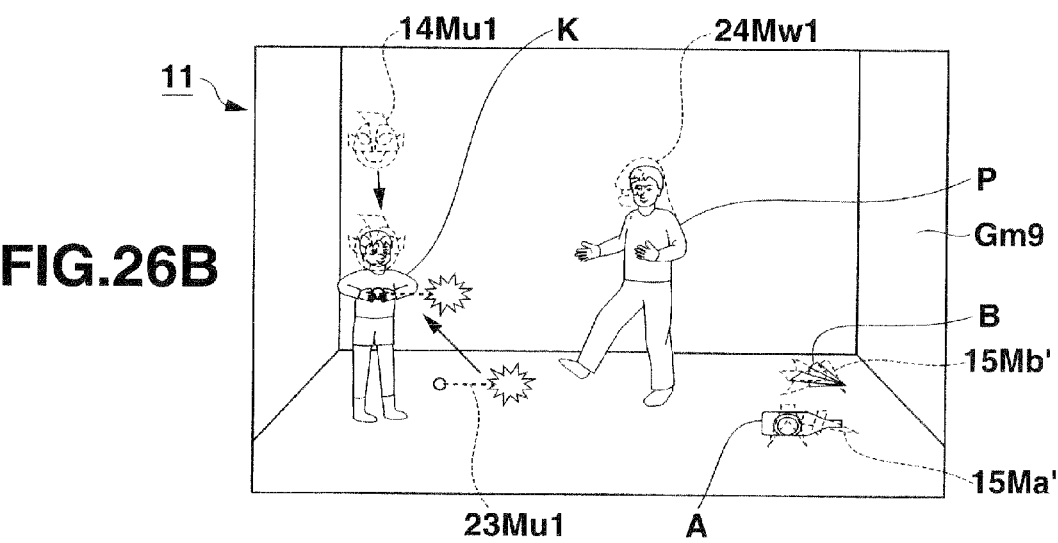
FIG. 26B shows shot image data (added marking data) Gm9.

If it has been determined that the motion is almost the same as the motion data 23P (Yes in step SE1), the fourth marking unit 168 reads the marking data 23Mu1 stored so as to correspond to the motion data 23P, adds the mark data 23Mu1 to the image of the face part of the extracted target image data, displays the resulting data, and stores the data into the working data memory temporarily as shot image data (added marking data) Gm9 as shown in FIG. 26B (step SE2).

Then, if it has been determined that shooting is now in progress with the digital camera 10 (Yes in step SE3), the audio data 23Su stored so as to correspond to the motion data 23P is read and output from the audio output unit 13 (step SE4).

Thereafter, control proceeds to the process in step S2.

Here, the marking data 23Mu1 may be displayed so as to either overlap with or be placed near the face part of the extracted target image data.

The shot image data (added marking data) Gm1 to Gm9 consecutively created on the working memory in the processes of step SA to step SE are stored into the added mark data to shot image data memory 26 (step S2).

If it has been determined that the shooting of a series of shot image data Gn (G1 to G9) with the image pickup unit 21 has been completed (Yes in step S3), it is determined whether control proceeds to the process of generating a composite image on the basis of a series of shot image data (added marking data) Gm (Gm1 to Gm9) stored in the shot image data (added marking data) memory 26 (step S4).

If the generation of a composite image is specified as a result of the detection of the input of an operation signal from the input unit 12 or if the acquisition of shot image data and the completion of the marking process have been detected, the CPU 16 determines that control proceeds to the process of generating a composite image (Yes in step S5).

Then, the shot image data (added marking data) Gm (Gm1 to Gm9) is read from the shot image data (added marking data) memory 26 into the working memory and control proceeds to the composite process A of FIG. 15 (step SF).

Composite Process A

The CPU 16 determines whether the shot image data (added marking data) Gm (Gm1 to Gm9) read from the shot image data (added marking data) memory 26 into the working memory include target image data to which marking data has been added in the marking processes A and C (step SF1).

Step SF1 will be explained using FIGS. 18B to 26B. It is determined whether target image data (image data on actor P) to which marking data 24Mw1 has been added or target image data (image data on actor K) to which marking data 14Mu1 has been added is present in the shot image data (added marking data) Gm.

Then, if it has been determined that target image data is present (Yes in step SF1), the moving image generating unit 170 captures the movement of target image data in the shot image data Gm (Gm1 to Gm9) on the basis of position information added to the target image data to which the marking data has been added (step SF2).

Then, the replacing unit 169 reads the replaced graphic data (1) 24Gw1 corresponding to the marking data 24Mw1 in the replaced graphic data memory (for actors) 24 and the replaced graphic data 14Gu1 corresponding to the marking data 14Mu1 in the changing motion data memory 14 and draws replaced graphic data in a plurality of poses shown in FIGS. 18C to 26C according to the captured movement.

Thereafter, the composite moving image generating unit 170 replaces the replaced graphic data on the basis of position information on the corresponding target image data and creates composite image data GG (GG1 to GG9) combined with a prepared background image GG (step SF3).

Figure 23A:
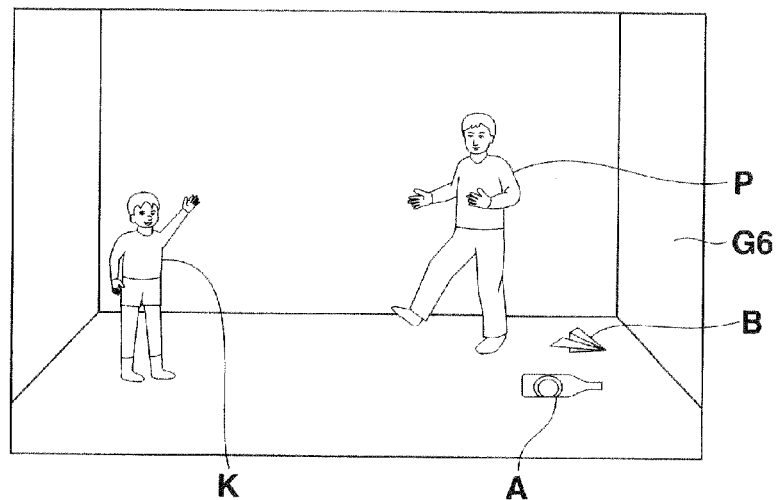
FIG. 23A shows shot image data G6.
Figure 23B:
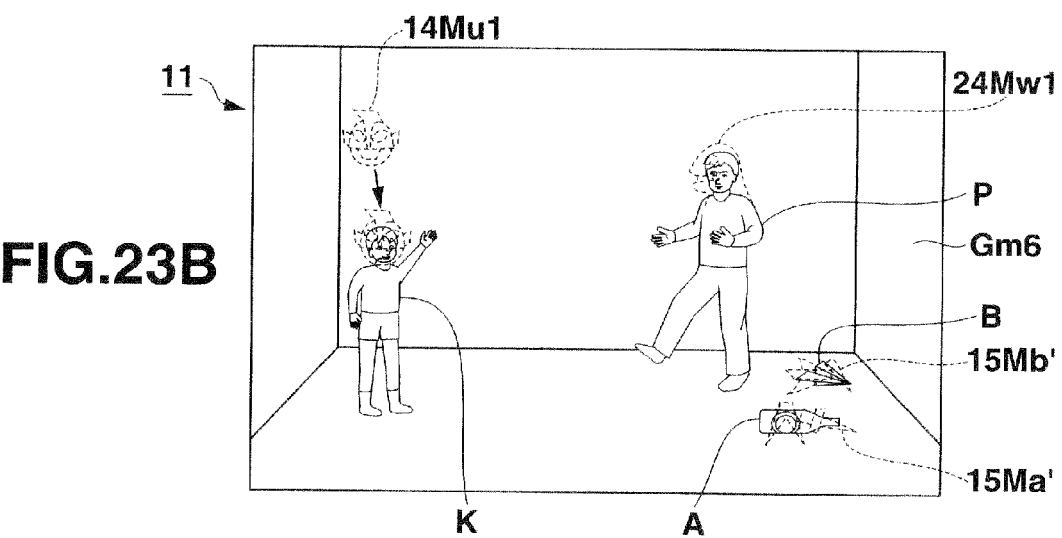
FIG. 23B shows shot image data (added marking data) Gm6.
Figure 23C:
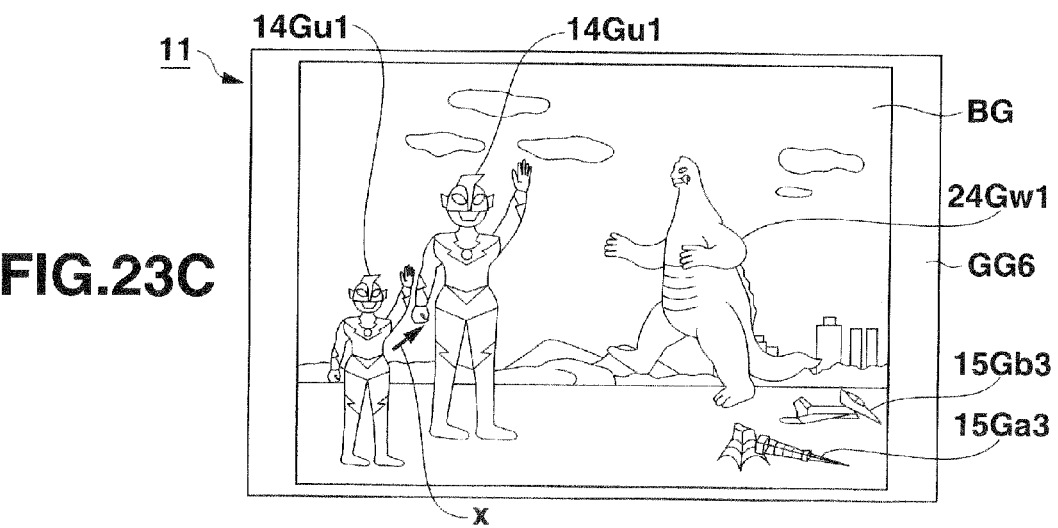
FIG. 23C shows composite image data GG6 in the embodiment.

At this time, as shown by arrow x in FIG. 23C, replaced graphic data 14Gu1 that draws the same pose as that of actor K is enlarged at the time of drawing.

Then, the CPU 16 reads the audio data 24Sw1 stored so as to correspond to the replaced graphic data 24Gw1 and stores the audio data 24Sw1 in such a manner that it corresponds to composite images GG (GG1 to GG9).

Moreover, the CPU 16 reads the audio data 14Su1 stored so as to correspond to the replaced graphic data 14Gu1 and stores audio data 14Su1 in such a manner that it corresponds to composite images GG (GG6 to GG9) (step SF4).

Next, the sub-flowchart of the composite process B shown in FIG. 16 is executed (step SG).

Composite Process B

The CPU 16 determines whether the shot image data (added marking data) Gm (Gm1 to Gm9) read from the shot image data (added marking data) memory 26 into the working memory include target image data to which marking data has been added in the marking process B (step SG1).

Step SG1 will be explained using FIGS. 18B to 26B. It is determined whether target image data (image data on object A) to which marking data 15Ma1 has been added or target image data (image data on object B) to which marking data 15Mb1 has been added is present in the shot image data (added marking data) Gm.

Then, if it has been determined that target image data is present (Yes in step SG1), the composite moving image generating unit 170 reads the replaced graphic data corresponding to the marking data in the replaced graphic data memory (for objects) 15, replaces the replaced graphic data on the basis of position information on the corresponding target image data, and adds the resulting data to the composite moving image data GG (GG1 to GG9) created in step SF3 to produce composite image data (step SG2).

Step SG2 will be explained using FIGS. 18B to 26B. The target image data (image data on object B) to which marking data (before contact) 15Mb1 has been added is replaced with replaced graphic data 15Gb1. The resulting data is added to the composite moving image data created in step SF3 to produce composite image data.

Then, the CPU 16 reads the audio data 15Sb1 stored so as to correspond to the replaced graphic data 15*b*1 and stores the audio data 15Sb1 in such a manner that it corresponds to the composite images GG (GG1 to GG9) (step SG3).

Next, the sub-flowchart of the composite process C shown in FIG. 17 is executed (step SH).

Composite Process C

The CPU 16 determines whether the shot image data (added marking data) Gm (Gm1 to Gm9) read from the shot image data memory (added marking data) 26 into the working memory include target image data to which marking data has been added in the marking process D (step SH1).

Step SH1 will be explained using FIG. 26B. It is determined whether target image data to which marking data 23Mu1 has been added is present in the shot image data (added marking data) Gm.

Then, if it has been determined that target image data is present (Yes in step SH1), the composite moving image generating unit 170 reads the replaced graphic data corresponding to the marking data in the special effect graphic data memory 23, replaces the replaced graphic data on the basis of position information on the corresponding marking data, and adds the resulting data to the composite moving image data GG (GG1 to GG9) created in step SG2 to produce composite image data (step SH2).

Furthermore, the composite moving image generating unit 170 acquires position information on the composite replaced graphic data, and determines the positional relationship between the peripheral part of the replaced graphic data and other replaced graphic data. If the peripheral part of the replaced graphic data makes contact with or overlaps with the other replaced graphic data, the composite moving image generating unit 170 further adds position information on the contact or overlap to produce composite image data (step SH3).

Figure 26C:
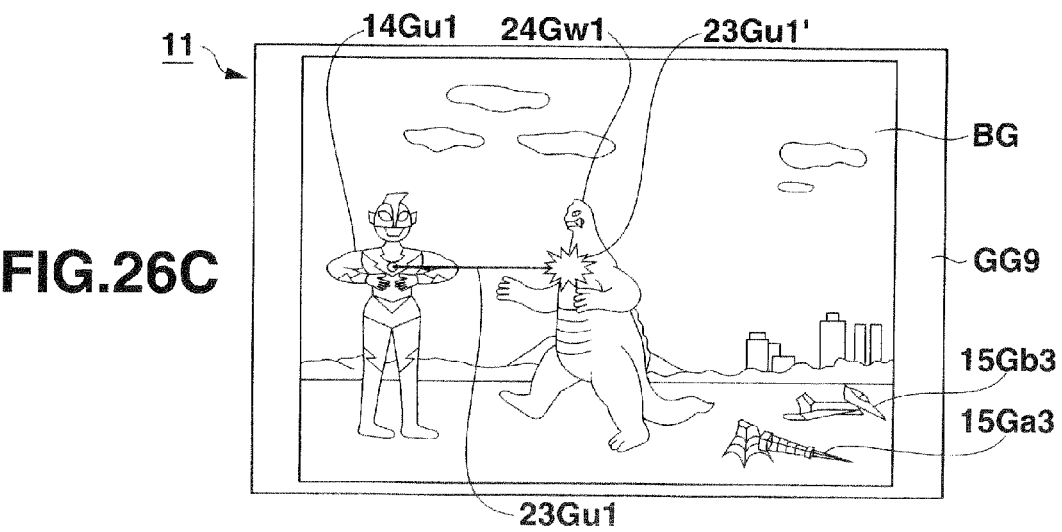
FIG. 26C shows composite image data GG9 in the embodiment.

Step SH2 and step SF3 will be explained using FIG. 26C. Replaced graphic data 23Gu1 is added to the position to which marking data 23Mu1 has been added to produce composite image data. Moreover, graphic data 23Gu1' is added to the position where the replaced graphic data 23Gu1 makes contact with replaced graphic data 24Gw1 to produce composite image data.

Then, the CPU 16 reads the audio data 23Su1 stored so as to correspond to the replaced graphic data 23Gu1 and stores it in such a manner that the audio data 23Su1 corresponds to the composite images GG (GG1 to GG9) (step SH4).

Thereafter, the CPU 16 converts the composite images GG (GG1 to GG9) produced in the composite processes A to C into audio-data-added composite image data as shown in FIG. 9 and stores the resulting data into the composite image data memory 27 (step S6).

Then, the composite moving image data is output to the display unit 11, which reproduces and displays the data (step S7).

When carrying out the above-described processes, the server 30 reads the composite moving image data stored in the composite image data memory 27 and transfers the data to the digital camera or the communication terminal 40, the sender of the shot image data Gn (G1 to G9) received in step S1 (step S7).

Accordingly, it is possible to create a composite moving image easily according to the actor's will.

The individual processes performed on the composite image output unit described in the embodiment can be stored in the form of a program executable on a computer into an external recording medium (33), such as a memory card (e.g., a ROM card or a RAM card), a magnetic disk (e.g., a floppy disk or a hard disk), an optical disk (e.g., CD-ROM or a DVD), or a semiconductor memory. Then, the external storage medium can be distributed.

Furthermore, program data to realize the individual methods can be transferred in the form of program code on a network (e.g., the Internet) N. The program data can be taken in from a computer terminal (e.g., a program server) connected to the network (or the Internet) N and the function of creating composite moving image data from the aforementioned shot image data Gn and outputting the resulting data can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A composite image generating apparatus comprising:
   a first storage unit configured to store a motion to be combined and first part image data such that the motion and the first part image data correspond to each other;
   an input unit configured to input a plurality of items of image data;
   a first determining unit configured to determine whether or not a movement of a part changing over a plurality of items of the image data input by the input unit is substantially the same as the motion stored in the first storage unit;
   a first composite unit configured to read the first part image data stored in the first storage unit correspondingly to the motion and combine the first part image data with the image data having the changing part, if the first determining unit determines that the movement is substantially the same as the motion;
   a second storage unit configured to store a plurality of target image data to be replaced;
   a second determining unit configured to determine whether or not the image data input by the input unit includes the target image data stored in the second storage unit; and
   a second composite unit configured to add specific image data to the combined image data produced by the first composite unit based on a positional relationship between the target image data and the image data having the changing part to produce composite image data, if the second determining unit determines that the input image data includes the target image data.

2. The composite image generating apparatus according to claim 1, wherein the second storage unit is configured to further store second part image data such that the second part image data and the target image data to be replaced correspond to each other, and
   wherein the composite image generating apparatus further comprises a third composite unit configured to read the second part image data stored correspondingly to the target image data to be replaced and add the second part image data to a position of the target image data to be replaced to produce composite image data, if the second determining unit determines that the input image data includes the target image data to be replaced.

3. The composite image generating apparatus according to claim 2, further comprising:
   a third storage unit configured to store a motion of the image data having the changing part and third part image data such that the motion and the third part image data correspond to each other;
   a third determining unit configured to determine whether or not a movement of the image data having the changing part over a plurality of items of image data input by the input unit is substantially the same as the motion stored in the third storage unit; and
   a fourth composite unit configured to read the third part image data stored in the third storage unit correspondingly to the motion and add the third part image data to the combined image data produced by the first composite unit to produce composite image data, if the third determining unit determines that the movement is substantially the same as the motion.

4. The composite image generating apparatus according to claim 1, wherein the input unit includes an image shooting unit.

5. The composite image generating apparatus according to claim 1, wherein the input unit includes a communication unit configured to communicate said plurality of items of image data with outside.

6. The composite image generating apparatus according to claim 1, further comprising a display unit configured to display the combined image data produced by the first composite unit.

7. The composite image generating apparatus according to claim 1, wherein the first part image data comprises 3D images.

8. A composite image generating method comprising:
inputting a plurality of items of image data;
determining whether or not a movement of a part changing over a plurality of items of the input image data is substantially the same as a motion set so as to correspond to first part image data;
combining, if it is determined that the movement is substantially the same as the motion, the first part image data set correspondingly to the motion with the image data having the changing part;
storing a plurality of target image data to be replaced,
determining whether or not the input image data includes the stored target image data, and
adding, if it is determined that the input image data includes the target image data, specific image data to the combined image data based on a positional relationship between the target image data and the image data having the changing part to produce composite image data.

9. A non-transitory computer readable recording medium having a program stored thereon for use with an image generating apparatus including an image input unit, the program causing the image generating apparatus to perform functions comprising:
inputting a plurality of image data by the image input unit,
determining whether or not a movement of a part changing over a plurality of items of the input image data is substantially the same as a motion set so as to correspond to first part image data,
combining, if the it is determined that the movement is substantially the same as the motion, the first part image data set correspondingly to the motion with the image data having the changing part,
storing a plurality of target image data to be replaced,
determining whether or not the input image data includes the stored target image data, and
adding, if it is determined that the input image data includes the target image data, specific image data to the combined image data based on a positional relationship between the target image data and the image data having the changing part to produce composite image data.

10. A composite image generating apparatus comprising:
a first storage unit configured to store a motion to be combined and first part image data such that the motion and the first part image data correspond to each other;
an input unit configured to input a plurality of items of image data;
a first determining unit configured to determine whether or not a movement of a part changing over a plurality of items of the image data input by the input unit is substantially the same as the motion stored in the first storage unit;
a first composite unit configured to read the first part image data stored in the first storage unit correspondingly to the motion and combine the first part image data with the image data having the changing part, if the first determining unit determines that the movement is substantially the same as the motion; and
a moving image data creating unit configured to create moving image data by changing the first part image data in accordance with a movement of image data in the part changing over the plurality of items of the image data,
wherein the first composite unit creates composite moving image data which includes the moving data created by the moving image data creating unit.

11. The composite image generating apparatus according to claim 10, wherein the input unit includes an image shooting unit.

12. The composite image generating apparatus according to claim 10, wherein the input unit includes a communication unit configured to communicate said plurality of items of image data with outside.

13. The composite image generating apparatus according to claim 10, further comprising a display unit configured to display the combined image data produced by the first composite unit.

14. The composite image generating apparatus according to claim 10, wherein the first part image data comprises 3D images.

15. A composite image generating method comprising:
inputting a plurality of items of image data;
determining whether or not a movement of a part changing over a plurality of items of the input image data is substantially the same as a motion set so as to correspond to first part image data;
combining, if it is determined that the movement is substantially the same as the motion, the first part image data set correspondingly to the motion with the image data having the changing part; and
creating moving image data by changing the first part image data in accordance with a movement of image data in the part changing over the plurality of items of the image data,
wherein the first composite unit creates composite moving image data which includes the moving data created by the moving image data creating unit.

16. A non-transitory computer readable recording medium having a program stored thereon for use with an image generating apparatus including an image input unit, the program causing the image generating apparatus to perform functions comprising:
inputting a plurality of image data by the image input unit,
determining whether or not a movement of a part changing over a plurality of items of the input image data is substantially the same as a motion set so as to correspond to first part image data,
combining, if it is determined that the movement is substantially the same as the motion, the first part image data set correspondingly to the motion with the image data having the changing part, and
creating moving image data by changing the first part image data in accordance with a movement of image data in the part changing over the plurality of items of the image data,
wherein the first composite unit creates composite moving image data which includes the moving data created by the moving image data creating unit.

* * * * *